(12) United States Patent
Hawkins et al.

(10) Patent No.: US 9,159,021 B2
(45) Date of Patent: Oct. 13, 2015

(54) PERFORMING MULTISTEP PREDICTION USING SPATIAL AND TEMPORAL MEMORY SYSTEM

(71) Applicant: Numenta, Inc., Redwood City, CA (US)

(72) Inventors: Jeffrey C. Hawkins, Atherton, CA (US); Ronald Marianetti, Campbell, CA (US)

(73) Assignee: Numenta, Inc., Redwood City, CA (US)

( * ) Notice: Subject to any disclaimer, the term of this patent is extended or adjusted under 35 U.S.C. 154(b) by 270 days.

(21) Appl. No.: 13/658,200

(22) Filed: Oct. 23, 2012

(65) Prior Publication Data

US 2014/0114896 A1    Apr. 24, 2014

(51) Int. Cl.
G06N 3/063  (2006.01)
G06N 3/04   (2006.01)
G06N 99/00  (2010.01)

(52) U.S. Cl.
CPC ............. *G06N 3/049* (2013.01); *G06N 3/063* (2013.01); *G06N 99/005* (2013.01)

(58) Field of Classification Search
USPC ............................................... 706/47, 50, 59
See application file for complete search history.

(56) References Cited

U.S. PATENT DOCUMENTS

| | | |
|---|---|---|
| 4,766,534 A | 8/1988 | DeBenedictis |
| 4,845,744 A | 7/1989 | DeBenedictis |
| 5,113,507 A | 5/1992 | Jaeckel |
| 5,255,348 A | 10/1993 | Nenov |
| 5,712,953 A | 1/1998 | Langs |
| 5,729,661 A | 3/1998 | Keeler et al. |
| 5,761,389 A | 6/1998 | Maeda et al. |
| 6,028,608 A | 2/2000 | Jenkins |
| 6,122,014 A | 9/2000 | Panusopone et al. |
| 6,144,711 A | 11/2000 | Raleigh et al. |
| 6,195,622 B1 | 2/2001 | Altschuler et al. |
| 6,400,996 B1 | 6/2002 | Hoffberg et al. |
| 6,468,069 B2 | 10/2002 | Lemelson et al. |
| 6,567,814 B1 | 5/2003 | Banker et al. |
| 6,615,211 B2 | 9/2003 | Beygelzimer et al. |
| 6,625,585 B1 | 9/2003 | MacCuish et al. |

(Continued)

FOREIGN PATENT DOCUMENTS

| | | |
|---|---|---|
| EP | 1 557 990 | 7/2005 |
| WO | WO 2006/063291 | 6/2006 |

(Continued)

OTHER PUBLICATIONS

Pilka et al., Multi-step Ahead Prediction Using Neural Networks [online], Sep. 2011 [retrieved on Sep. 30, 2014]. Retrieved from the Internet<URL:http://ieeexplore.ieee.org/stamp/stamp.jsp?tp=&arnumber=6044279>.*

(Continued)

*Primary Examiner* — Alan Chen
*Assistant Examiner* — Nathan Brown, Jr.
(74) *Attorney, Agent, or Firm* — Fenwick & West LLP

(57) ABSTRACT

Embodiments relate to making predictions for values or states to follow multiple time steps after receiving a certain input data in a spatial and temporal memory system. During a training stage, relationships between states of the spatial and temporal memory system at certain times and spatial patterns of the input data detected a plurality of time steps later after the certain time steps are established. Using the established relationships, the spatial and temporal memory system can make predictions multiple time steps into the future based on the input data received at a current time.

17 Claims, 9 Drawing Sheets

(56) References Cited

U.S. PATENT DOCUMENTS

| | | |
|---|---|---|
| 6,714,941 B1 | 3/2004 | Lerman et al. |
| 6,751,343 B1 | 6/2004 | Ferrell et al. |
| 6,957,241 B2 | 10/2005 | George |
| 7,088,693 B2 | 8/2006 | George |
| 7,251,637 B1 | 7/2007 | Caid et al. |
| 7,308,134 B2 | 12/2007 | Wersing et al. |
| 7,430,546 B1 | 9/2008 | Suri |
| 7,613,675 B2 | 11/2009 | Hawkins et al. |
| 7,620,608 B2 | 11/2009 | Jaros et al. |
| 7,624,085 B2 | 11/2009 | Hawkins et al. |
| 7,676,458 B2 | 3/2010 | Aggarwal et al. |
| 7,739,208 B2 | 6/2010 | George et al. |
| 7,826,990 B2 | 11/2010 | Nasle et al. |
| 7,840,395 B2 | 11/2010 | Nasle et al. |
| 7,840,396 B2 | 11/2010 | Radibratovic et al. |
| 7,844,439 B2 | 11/2010 | Nasle et al. |
| 7,844,440 B2 | 11/2010 | Nasle et al. |
| 7,899,775 B2 | 3/2011 | George et al. |
| 7,904,412 B2 | 3/2011 | Saphir et al. |
| 7,937,342 B2 | 5/2011 | George et al. |
| 7,941,389 B2 | 5/2011 | Marianetti et al. |
| 7,941,392 B2 | 5/2011 | Saphir |
| 7,983,998 B2 | 7/2011 | George et al. |
| 8,037,010 B2 | 10/2011 | Jaros et al. |
| 8,081,209 B2 | 12/2011 | Ji et al. |
| 8,103,603 B2 | 1/2012 | George et al. |
| 8,112,367 B2 | 2/2012 | George et al. |
| 8,121,961 B2 | 2/2012 | George et al. |
| 8,175,981 B2 | 5/2012 | Hawkins et al. |
| 8,175,984 B2 | 5/2012 | George |
| 8,175,985 B2 | 5/2012 | Sayfan et al. |
| 8,195,582 B2 | 6/2012 | Niemasik et al. |
| 8,219,507 B2 | 7/2012 | Jaros et al. |
| 8,285,667 B2 | 10/2012 | Jaros et al. |
| 8,290,886 B2 | 10/2012 | George et al. |
| 2002/0002688 A1 | 1/2002 | Gregg et al. |
| 2002/0150044 A1 | 10/2002 | Wu et al. |
| 2002/0161736 A1 | 10/2002 | Beygelzimer et al. |
| 2003/0069002 A1 | 4/2003 | Hunter et al. |
| 2003/0123732 A1 | 7/2003 | Miyazaki et al. |
| 2003/0167111 A1 | 9/2003 | Kipersztok et al. |
| 2004/0002838 A1 | 1/2004 | Oliver et al. |
| 2004/0142325 A1 | 7/2004 | Mintz et al. |
| 2004/0148520 A1 | 7/2004 | Talpade et al. |
| 2004/0267395 A1 | 12/2004 | Discenzo et al. |
| 2005/0002572 A1 | 1/2005 | Saptharishi et al. |
| 2005/0028033 A1 | 2/2005 | Kipersztok et al. |
| 2005/0063565 A1 | 3/2005 | Nagaoka et al. |
| 2005/0190990 A1 | 9/2005 | Burt et al. |
| 2005/0222811 A1 | 10/2005 | Jakobson et al. |
| 2006/0093188 A1 | 5/2006 | Blake et al. |
| 2006/0161736 A1 | 7/2006 | Huang |
| 2006/0184462 A1 | 8/2006 | Hawkins |
| 2006/0212444 A1 | 9/2006 | Handman et al. |
| 2006/0235320 A1 | 10/2006 | Tan et al. |
| 2006/0248026 A1 | 11/2006 | Aoyama et al. |
| 2006/0248073 A1 | 11/2006 | Jones et al. |
| 2006/0253491 A1 | 11/2006 | Gokturk et al. |
| 2006/0259163 A1 | 11/2006 | Hsiung et al. |
| 2007/0005531 A1 | 1/2007 | George et al. |
| 2007/0019754 A1 | 1/2007 | Raleigh et al. |
| 2007/0192264 A1 | 8/2007 | Hawkins et al. |
| 2007/0192267 A1 | 8/2007 | Hawkins et al. |
| 2007/0192268 A1 | 8/2007 | Hawkins et al. |
| 2007/0192269 A1 | 8/2007 | Saphir et al. |
| 2007/0192270 A1 | 8/2007 | Hawkins et al. |
| 2007/0228703 A1 | 10/2007 | Breed |
| 2007/0276744 A1 | 11/2007 | Burke |
| 2007/0276774 A1 | 11/2007 | Ahmad et al. |
| 2008/0059389 A1 | 3/2008 | Jaros et al. |
| 2008/0140593 A1 | 6/2008 | George et al. |
| 2008/0183647 A1 | 7/2008 | Hawkins et al. |
| 2008/0201286 A1 | 8/2008 | Hawkins et al. |
| 2008/0208783 A1 | 8/2008 | Jaros et al. |
| 2008/0208915 A1 | 8/2008 | George et al. |
| 2008/0208966 A1 | 8/2008 | Edwards et al. |
| 2009/0006289 A1 | 1/2009 | Jaros et al. |
| 2009/0116413 A1 | 5/2009 | George |
| 2009/0150311 A1 | 6/2009 | George |
| 2009/0240886 A1 | 9/2009 | Sayfan et al. |
| 2009/0313193 A1 | 12/2009 | Hawkins et al. |
| 2010/0049677 A1 | 2/2010 | Jaros et al. |
| 2010/0185567 A1 | 7/2010 | Niemasik et al. |
| 2010/0191684 A1 | 7/2010 | George |
| 2010/0207754 A1 | 8/2010 | Shostak et al. |
| 2010/0312730 A1 | 12/2010 | Weng et al. |
| 2011/0231351 A1 | 9/2011 | George et al. |
| 2012/0005134 A1 | 1/2012 | Jaros et al. |
| 2012/0109857 A1 | 5/2012 | George et al. |
| 2012/0166364 A1 | 6/2012 | Ahmad et al. |
| 2012/0197823 A1 | 8/2012 | Hawkins et al. |
| 2012/0330885 A1 | 12/2012 | Jaros et al. |
| 2013/0054495 A1 | 2/2013 | Hawkins et al. |
| 2013/0054496 A1 | 2/2013 | Marianetti et al. |
| 2013/0054552 A1 | 2/2013 | Hawkins et al. |

FOREIGN PATENT DOCUMENTS

| | | |
|---|---|---|
| WO | WO 2008/067326 | 6/2008 |
| WO | WO 2009/006231 | 1/2009 |

OTHER PUBLICATIONS

Fan, K.-C. et al., "A Genetic Sparse Distributed Memory Approach to the Application of Handwritten Character Recognition," *Pattern Recognition*, 1997, pp. 2015-2022, vol. 20, No. 12.

Rachkovskij, D., "Representation and Processing of Structures with Binary Sparse Distributed Codes," *IEEE Transactions on Knowledge and Data Engineering*, Mar./Apr. 2011, pp. 261-276, vol. 13, No. 2.

United States Office Action, U.S. Appl. No. 13/046,464, Jun. 19, 2013, fourteen pages.

European Patent Office, Supplementary European Search Report and Opinion, European Patent Application No. 11756775.0, Oct. 1, 2013, eight pages.

Robinson, D. et al., "Spoken Language Identification with Hierarchical Temporal Memories," 2009 CS229 Course on Machine Learning at Stanford University, Dec. 11, 2009, five pages. [Online] [Retrieved Sep. 19, 2013] Retrieved from the Internet <URL: http://cs229.stanford.edu/proj2009/FalcoLeungRobinson.pdf.>.

Adelson, E.H. et al., "The Perception of Shading and Reflectance," *Perception as Bayesian Inference*, 1996, pp. 409-423, Knill, D.C. et al., eds., Cambridge University Press, UK.

Agrawal, R. et al., "Mining Sequential Patterns," *IEEE*, 1995, pp. 3-14.

Ahmad, S. et al., "PowerNuPIC," Numenta, Jun. 2008, Numenta HTM Workshop, Jun. 23-24, 2008, SRI Campus, Menlo Park, CA, fifty-six pages.

Ahmad, S., "NuPIC Jumpstart—Part II," Numenta, May 2008, Numenta HTM Workshop, Jun. 23-24, 2008, SRI Campus, Menlo Park, CA, thirty-three pages.

Becerra, J.A. et al., "Multimodule Artificial Neural Network Architectures for Autonomous Robot Control Through Behavior Modulation," *IWANN 2003, LNCS*, pp. 169-176, vol. 2687.

Biancaniello, P. et al., Multimodal Pattern Recognition with Hierarchical Temporal Memory (MPR), Lockheed Martin Brain-Inspired Computing Research Overview, Numenta HTM Workshop, Jun. 2008, twelve pages.

Bobier, B., "Content-Based Image Retrieval Using Hierarchical Temporal Memory," Numenta HTM Workshop, Jun. 23-24, 2008, SRI Campus, Menlo Park, CA, seven pages.

Bryhni et al., "A Comparison of Load Balancing Ttechniques for Scalable Web Servers," IEEE Network, Jul./Aug. 2000, pp. 58-64.

Ceisel, A. et al., "Using HTM Networks to Decode Neural Signals from the Motor Cortex: A Novel Approach to Brain-Computer Interface Control," Illinois Institute of Technology, Numenta HTM Workshop, 2009, four pages.

Chapela, V., "Preventing Financial Fraud," Smart Security Services, Numenta HTM Workshop, 2009, forty pages.

(56) References Cited

OTHER PUBLICATIONS

China State Intellectual Property Office, First Office Action, Chinese Application No. 200580042258.7, Jul. 10, 2009, twelve pages.
China State Intellectual Property Office, First Office Action, Chinese Application No. 200780007274.1, Jun. 24, 2011, five pages.
Colombe, J., "A Survey of Recent Developments in Theoretical Neuroscience and Machine Vision," *Proceedings of the IEEE Applied Imagery Pattern Recognition Workshop,* 2003, nine pages.
Cormack, G.V. et al., "Data Compression Using Dynamic Markov Modelling," *The Computer Journal,* 1987, pp. 541-550, vol. 30, No. 6.
Csapo, A.B. et al., "Object Categorization Using VFA-Generated Nodemaps and Hierarchical Temporal Memories," *IEEE International Conference on Computational Cybernetics,* Oct. 7, 2007, pp. 257-262.
Curry, C. et al., "Speech Processing with HTM," Numenta HTM Workshop, Jun. 23-24, 2008, SRI Campus, Menlo Park, CA, fifty-seven pages.
Dean, T., "Learning Invariant Features Using Inertial Priors," *Annals of Mathematics and Artificial Intelligence,* 2006, pp. 223-250, vol. 47.
Demiris, Y. et al., "From Motor Babbling to Hierarchical Learning by Imitation: A Robot Developmental Pathway," *Proceedings of the Fifth International Workshop on Epigenetic Robotics: Modeling Cognitive Development in Robotic Systems,* 2005, pp. 31-37.
Dimitrova, N. et al., "Motion Recovery for Video Content Classification," *ACM Transactions on Information Systems,* Oct. 1995, pp. 408-439, vol. 13, No. 4.
Ding, C.H.Q., "Cluster Merging and Splitting in Hierarchical Clustering Algorithms," *Proceedings of the 2002 IEEE International Conference on Data Mining (ICDM 2002),* Dec. 9, 2002, pp. 139-146.
Dolin, R. et al., "Scalable Collection Summarization and Selection," *Association for Computing Machinery,* 1999, pp. 49-58.
Dubinsky, D., "Numenta Business Strategy," Numenta,Inc., Jun. 2008, Numenta HTM Workshop, Jun. 23-24, 2008, SRI Campus, Menlo Park, CA, fifteen pages.
Dudgeon, M. et al., "Evolved HTM Preprocessing," Qualia Labs, Jun. 25, 2009, nine pages.
Eastman, K. "HTM's & Airline Passenger Behavior: Prediction and Inference Model," Numenta HTM Workshop, 2009, ten pages.
EDSA, "Project Information," Apr. 2008, Numenta HTM Workshop, Jun. 23-24, 2008, SRI Campus, Menlo Park, CA, four pages.
Eswaran, K., "Numenta Lightning Talk on Dimension Reduction and Unsupervised Learning," Numenta HTM Workshop, Jun. 23-24, 2008, SRI Campus, Menlo Park, CA, thirty pages.
European Patent Office, Examination Report, European Patent Application No. 05853611.1, Jun. 23, 2008, four pages.
European Patent Office, Examination Report, European Patent Application No. 07750385.2, Apr. 21, 2009, eight pages.
European Patent Office, Examination Report, European Patent Application No. 08796030.8, Dec. 6, 2010, seven pages.
European Patent Office, Examination Report, European Patent Application No. 07750385.2, Dec. 6, 2010, eight pages.
Farahmand, N. et al., "Online Temporal Pattern Learning," *Proceedings of the International Joint Conference on Neural Networks,* Jun. 14-19, 2009, pp. 797-802, Atlanta, GA, USA.
Felleman, D.J. et al., "Distributed Hierarchical Processing in the Primate Cerebral Cortex," *Cerebral Cortex,* Jan./Feb. 1991, pp. 1-47, vol. 1.
Fine, S. et al., "The Hierarchical Hidden Markov Model: Analysis and Applications," *Machine Learning,* 1998, pp. 41-62, vol. 32, Kluwer Academic Publishers, Boston, USA.
Finley, M., "Exploration of Motion Capture," Qualia Labs, Jun. 24, 2008, Numenta HTM Workshop, Jun. 23-24, 2008, SRI Campus, Menlo Park, CA, thirty-six pages.
Foldiak, P., "Learning Invariance from Transformation Sequences," *Neural Computation,* 1991, Massachusetts Institute of Technology, pp. 194-200, vol. 3, No. 2.

Fukushima, K., "Neocognitron: A Self-Organizing Neural Network Model for a Mechanism of Pattern Recognition Unaffected by Shift in Position," *Biol. Cybernetics,* 1980, pp. 193-202, vol. 36.
Garalevicius, S., "Memory-Prediction Framework for Pattern Recognition: Performance and Suitability of the Bayesian Model of Visual Cortex," *American Association of Artificial Intelligence,* 2007, six pages.
George, D. "Thesis: How the Brain Might Work: A Hierarchical and Temporal Model for Learning and Recognition," Dissertation, Dept. of Electrical Engineering and the Committee on Graduate Studies of Stanford University, Jun. 2008, one-hundred ninety-one pages.
George, D. et al., "A Hierarchical Bayesian Model of Invariant Pattern Recognition in the Visual Cortex," *Proceedings of IEEE International Joint Conference on Neural Networks,* Jul. 31-Aug. 4, 2005, pp. 1812-1817, vol. 3.
George, D. et al., "Invariant Pattern Recognition Using Bayesian Inference on Hierarchical Sequences," Technical Report, Oct. 2004, eight pages.
George, D. et al., "The HTM Learning Algorithms," Mar. 1, 2007, 44 pages. [Online] [Retrieved on Sep. 22, 2011] Retrieved from the Internet <URL:http://www.numenta.com/htm-overview/education/Numenta_HTM_Learning_Algos.pdf.>.
George, D. et al., "Towards a Mathematical Theory of Cortical Micro-circuits," *PLoS Computational Biology,* Oct. 2009, vol. 5, Issue 10, twenty-six pages.
Gottschalk, K. et al., "Introduction to Web Services Architecture," *IBM Systems Journal,* 2002, pp. 170-177, vol. 41, No. 2.
Guerrier, P., "A Generic Architecture for On-Chip Packet-Switched Interconnections," *Association for Computing Machinery,* 2000, pp. 250-256.
Guinea, D. et al., "Robot Learning to Walk: An Architectural Problem for Intelligent Controllers," *Proceedings of the 1993 International Symposium on Intelligent Control,* Aug. 1993, pp. 493-498, Chicago, USA.
Guo, C-E. et al., "Modeling Visual Patterns by Integrating Descriptive and Generative Methods," *International Journal of Computer Vision,* May 29, 2003, pp. 5-29, vol. 53, No. 1.
Haitani, R. et al., "Vitamin D Toolkit, Introduction," Jun. 24, 2008, Numenta HTM Workshop, Jun. 23-24, 2008, SRI Campus, Menlo Park, CA, eleven pages.
Haitani, R., "Smart Video: A Disruptive Market Opportunity for HTM," Numenta HTM Workshop, 2009, twelve pages.
Han, K. et al., "Automated Robot Behavior Recognition Applied to Robotic Soccer," *In Proceedings of the IJCAI-99 Workshop on Team Behaviors and Plan Recognition,* 1999, six pages.
Hartung, J. et al., "Presentation: Support for the Use of Hierarchical Temporal Memory Systems in Automated Design Evaluation: A First Experiment," Numenta HTM Workshop, 2009, thirty-one pages.
Hartung, J. et al., "Support for the Use of Hierarchical Temporal Memory Systems in Automated Design Evaluation: A First Experiment," *Proceedings of the ASME 2009 Int'l. Design Engineering Technical Conferences & Computers and Information in Engineering Conference,* Aug. 30-Sep. 2, 2009, ten pages, San Diego, CA, USA.
Hasegawa, Y. et al., "Learning Method for Hierarchical Behavior Controller," *Proceedings of the 1999 IEEE International Conference on Robotics & Automation,* May 1999, pp. 2799-2804.
Hawkins, J. "Hierarchical Temporal Memory: History-Progress-Today-Tomorrow," HTM Workshop, Jun. 2009, twenty-four pages.
Hawkins, J. "Prediction Toolkit Overview," Numenta HTM Workshop, 2009, four pages.
Hawkins, J. et al., "Hierarchical Temporal Memory: Concepts, Theory and Terminology," Numenta, Inc., Mar. 27, 2007, 20 pages. [Online] [Retrieved on Sep. 22, 2011] Retrieved from the Internet<URL:http://www.numenta.com/htm-overview/education/Numenta_HTM_Concepts.pdf.>.
Hawkins, J. et al., "On Intelligence," Sep. 2004, Times Books, Henry Holt and Company, New York, NY 10011.
Hawkins, J. et al., "Sequence Memory for Prediction, Inference and Behaviour," *Philosophical Transactions of The Royal Society B,* Mar. 31, 2009, pp. 1203-1209, vol. 364. [Online] [Retrieved Sep. 22, 2011] Retrieved from the Internet <URL:http://rstb.royalsocietypublishing.org/content/364/1521/1203.full.pdf.>.

(56) References Cited

OTHER PUBLICATIONS

Hawkins, J., "Why Can't a Computer Be More Like a Brain?" *IEEE Spectrum*, Apr. 1, 2007, pp. 21-26, vol. 44, No. 4.

Hernandez-Gardiol, N. et al., "Hierarchical Memory-Based Reinforcement Learning," *Proceedings of Neural Information Processing Systems*, 2001, seven pages.

Hinton, G.E. et al., "The "Wake-Sleep" Algorithm for Unsupervised Neural Networks," *Science*, May 26, 1995, pp. 1158-1161, vol. 268.

Hoey, "Hierarchical unsupervised learning of facial expression categories," *IEEE*, 2001, 0-7695-1293-3, pp. 99-106.

Hyvarinen, A. et al., "Bubbles: A Unifying Framework for Low-Level Statistical Properties of Natural Image Sequences," *J. Opt. Soc. Am. A.*, 2003, pp. 1237-1252, vol. 20, No. 7.

Isard, M. et al., "ICONDENSATION: Unifying Low-Level and High-Level Tracking in a Stochastic Framework," *Lecture Notes in Computer Science 1406*, 1998, pp. 893-908, Burkhardt, H. et al., ed., Springer-Verlag, Berlin.

Kim, J. et al., "Hierarchical Distributed Genetic Algorithms: A Fuzzy Logic Controller Design Application," *IEEE Expert*, Jun. 1996, pp. 76-84.

Kuenzer, A. et al., "An Empirical Study of Dynamic Bayesian Networks for User Modeling," *Proceedings of the UM 2001 Workshop on Machine Learning*, ten pages.

Lee, T.S. et al., "Hierarchical Bayesian Inference in the Visual Cortex," *J. Opt. Soc. Am. A. Opt. Image. Sci. Vis.*, Jul. 2003, pp. 1434-1448, vol. 20, No. 7.

Lenser, S. et al., "A Modular Hierarchical Behavior-Based Architecture," *RoboCup 2001, LNAI 2377*, 2002, pp. 423-428, Birk, A. et al, (eds.), Springer-Verlag, Berlin, Heidelberg.

Levinson, S. et al., "Automatic Language Acquisition for a Mobile Robot," Feb. 2005, Numenta HTM Workshop, Jun. 23-24, 2008, SRI Campus, Menlo Park, CA, twenty-seven pages.

Lewicki, M.S. et al., "Bayesian Unsupervised Learning of Higher Order Structure," *Proceedings of the 1996 Conference in Advances in Neural Information Processing Systems 9*, pp. 529-535.

Lim, "Estimation of Occlusion and Dense Motion Fields in a Bidirectional Bayesian Framework," *IEEE Transactions on Pattern Analysis and Machine Intelligence*, 2002, pp. 712-718, vol. 24, No. 5.

Lo, J. "Unsupervised Hebbian Learning by Recurrent Multilayer Neural Networks for Temporal Hierarchical Pattern Recognition," *Information Sciences and Systems 44th Annual Conference on Digital Object Identifier*, 2010, pp. 1-6.

Majure, L., "Unsupervised Phoneme Acquisition Using HTM," Jun. 25, 2009, eight pages.

Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.

Mari, J.-F. et al., "Temporal and Spatial Data Mining with Second-Order Hidden Markov Models," *Soft Computing—A Fusion of Foundations, Methodologies and Applications*, 2006, pp. 406-414, vol. 10, No. 5.

McDowell, C. et al., "SlugGo, a Computer Go Program," University of California at Santa Cruz, Numenta HTM Workshop, Jun. 23-24, 2008, SRI Campus, Menlo Park, CA, eighteen pages.

Miller, J. W. et al., "Biomimetic Sensory Abstraction Using Hierarchical Quilted Self-Organizing Maps," *Society of Photo-Optical Instrumentation Engineers*, 2006, eleven pages.

Mishkin, M. et al., "Hierarchical Organization of Cognitive Memory," *Phil. Trans. R. Soc. B.*, 1997, pp. 1461-1467, London.

Mitrovic, A., "An Intelligent SQL Tutor on the Web," *International Journal of Artificial Intelligence in Education*, 2003, pp. 171-195, vol. 13.

Muckli, L., "Predictive Coding in Apparent Motion," University of Glasgow, Numenta HTM Workshop, Jun. 25, 2009, twelve pages.

Murphy, K. et al., "Using the Forest to See the Trees: A Graphical Model Relating Features, Objects and Scenes,"*Advances in Neural Processing System*, 2004, vol. 16, eight pages.

Murray, S.O. et al., "Shaper Perception Reduces Activity in Human Primary Visual Cortex," *Proceedings of the Nat. Acad. Of Sciences of the USA*, Nov. 2002, pp. 15164-151169, vol. 99, No. 23.

Nair, D. et al., "Bayesian Recognition of Targets by Parts in Second Generation Forward Looking Infrared Images," *Image and Vision Computing*, 2000, pp. 849-864, vol. 18.

Namphol, A. et al., "Image Compression with a Hierarchical Neural Network," *IEEE transactions on Aerospace and Electronic Systems*, Jan. 1996, pp. 326-338, vol. 32, No. 1.

Naphade, M. et al., "A Probabilistic Framework for Semantic Video Indexing, Filtering, and Retrieval," *IEEE Transactions on Multimedia*, Mar. 2001, pp. 141-151, vol. 3, No. 1.

Niemasik, J. "Vision Toolkit," Numenta HTM Workshop, 2009, twenty-eight pages.

Numenta, Inc., "Business Strategy," Numenta HTM Workshop, 2009, fifteen pages.

Numenta, Inc., "Hierarchical Temporal Memory including HTM Cortical Learning Algorithms, Version 0.2.1," Sep. 12, 2011, sixty-eight pages. [Online] [Retrieved Sep. 22, 2011] Retrieved from the Internet <URL:http://www.numenta.com/htm-overview/education/HTM_CorticalLearningAlgorithms.pdf.>.

Numenta, Inc., "Hierarchical Temporal Memory: Comparison with Existing Models, Version 1.01," Mar. 1, 2007, four pages.

Numenta, Inc., "HTM Algorithms," Jun. 2008, Numenta HTM Workshop, Jun. 23-24, 2008, SRI Campus, Menlo Park, CA, sixty-seven pages.

Numenta, Inc., "HTM Workshop, Jumpstart," Jun. 2008, Numenta HTM Workshop, Jun. 23-24, 2008, SRI Campus, Menlo Park, CA, eighty-six pages.

Numenta, Inc., "Numenta Node Algorithms Guide NuPIC 1.6," Numenta, Jul. 22, 2008, pp. 1-7.

Numenta, Inc., "Numenta Node Algorithms Guide NuPIC 1.6," Numenta, Jun. 13, 2008, pp. 1-6.

Numenta, Inc., "Numenta Platform for Intelligent Computing: Programmer's Guide Version 1.0," Mar. 2007, one hundred seventy-seven pages.

Numenta, Inc., "NuPIC Update," Numenta HTM Workshop, 2009, twenty-four pages.

Numenta, Inc., "Problem Solving with HTMs," Jun. 2008, Numenta HTM Workshop, Jun. 23-24, 2008, SRI Campus, Menlo Park, CA, twenty-three pages.

Numenta, Inc., "Prototype to Demonstrate Automated Insect Detection and Discrimination," Numenta HTM Workshop, 2009, four pages.

Numenta, Inc., "Smart Music: Combining Musical Expectations with Algorithmic Composition," Numenta HTM Workshop, 2009, seven pages.

Numenta, Inc., "Technical Keynote," Numenta HTM Workshop, 2009, seventy-two pages.

Numenta, Inc., "Temporal Model Characteristics," Numenta HTM Workshop, 2009, fourteen pages.

Numenta, Inc., "Vision Framework," Jun. 2008, Numenta HTM Workshop, Jun. 23-24, 2008, SRI Campus, Menlo Park, CA, thirty-six pages.

Numenta, Inc., "What Have We Worked on Since the 2008 Workshop? Customer Applications Presentation," Numenta HTM Workshop, 2009, thirty-five pages.

Numenta, Inc., "Zeta1 Algorithms Reference, Version 1.0," Numenta Inc., Mar. 1, 2007, pp. 1-36.

Numenta, Inc., "Zeta1 Algorithms Reference, Version 1.2," Numenta Inc., Jun. 8, 2007, pp. 1-38.

Numenta, Inc., "Zeta1 Algorithms Reference, Version 1.3," Numenta Inc., Aug. 22, 2007, pp. 1-41.

Numenta, Inc., "Zeta1 Algorithms Reference, Version 1.5," Numenta Inc., Aug. 24, 2007, pp. 1-45.

Olshausen, B.A. et al., "A Neurobiological Model of Visual Attention and Invariant Pattern Recognition Based on Dynamic Routing Information," *Journal of Neuroscience*, Nov. 1993, pp. 4700-4719, vol. 13, No. 11.

Park, S. et al., "Recognition of Two-person Interactions Using a Hierarchical Bayesian Network," *ACM SIGMM International Workshop on Video Surveillance (IWVS)* 2003, pp. 65-76, Berkeley, USA.

(56) References Cited

OTHER PUBLICATIONS

PCT International Search Report and Written Opinion, PCT Application No. PCT/US2008/080347, Dec. 10, 2008, six pages.
PCT International Search Report and Written Opinion, PCT Application No. PCT/US2005/044729, May 14, 2007, twelve pages.
PCT International Search Report and Written Opinion, PCT Application No. PCT/US2007/003544, Jun. 16, 2008, ten pages.
PCT International Search Report and Written Opinion, PCT Application No. PCT/US2007/85661, Jun. 13, 2008, six pages.
PCT International Search Report and Written Opinion, PCT Application No. PCT/US2008/55389, Jul. 25, 2008, seven pages.
PCT International Search Report and Written Opinion, PCT Application No. PCT/US2008/55352, Aug. 1, 2008, seven pages.
PCT International Search Report and Written Opinion, PCT Application No. PCT/US2008/054631, Aug. 18, 2008, twelve pages.
PCT International Search Report and Written Opinion, PCT Application No. PCT/US2008/068435, Oct. 31, 2008, eleven pages.
PCT International Search Report and Written Opinion, PCT Application No. PCT/US2009/035193, Apr. 22, 2009, eleven pages.
PCT International Search Report and Written Opinion, PCT Application No. PCT/US2011/028231, May 19, 2011, nine pages.
PCT International Search Report and Written Opinion, PCT Application No. PCT/US2009/047250, Sep. 25, 2009, twelve pages.
Pearl, J., "Probabilistic Reasoning in Intelligent Systems: Networks of Plausible Inference," 1988, pp. 143-223, Morgan Kaufmann Publishers, Inc.
Poppel, E., "A Hierarchical Model of Temporal Perception," *Trends in Cognitive Sciences,* May 1997, pp. 56-61, vol. 1, No. 2.
Rao, R. et al., "Predictive Coding in the Visual Cortex: A Functional Interpretation of Some Extra-classical Receptive-field Effects," *Nature Neuroscience,* Jan. 1999, pp. 79-87, vol. 2, No. 1.
Riesenhuber, M. et al., "Hierarchical Models of Object Recognition in Cortex," *Nature Neuroscience,* Nov. 1999, pp. 1019-1025, vol. 2, No. 11.
Rojas, R., "Neural Networks: A Systematic Introduction," Springer-Verlag, 1996, pp. 20-21, 110-112, and 311-319.
Ross, L., "Discovering and Using Patterns in Plant Floor Data," Numenta HTM Workshop, Jun. 23-24, 2008, SRI Campus, Menlo Park, CA, twelve pages.
Saphir, B. "Numenta Web Services," Numenta HTM Workshop, 2009, twenty pages.
Saphir, B., "Power NuPIC Part II, How to Create a New Node Type," Numenta, Jun. 2008, Numenta HTM Workshop, Jun. 23-24, 2008, SRI Campus, Menlo Park, CA, thirty-two pages.
sdsystem24.com, "HTM Optimized Drug Therapy," Numenta HTM Workshop, Jun. 23-24, 2008, SRI Campus, Menlo Park, CA, seven pages.
Sinha, P. et al., "Recovering Reflectance and Illumination in a World of Painted Polyhedra," *Fourth International Conference on Computer Vision,* Berlin, May 11-14, 1993, pp. 156-163, IEEE Computer Society Press, Los Alamitos, CA.
Spence, C. et al., "Varying Complexity in Tree-Structured Image Distribution Models," *IEEE Transactions on Image Processing,* Feb. 2006, pp. 319-330, vol. 15, No. 2.
Starzyk, J.A. et al., "Spatio-Temporal Memories for Machine Learning: A Long-Term Memory Organization," *IEEE Transactions on Neural Networks,* May 2009, pp. 768-780, vol. 20, No. 5.
Stringer, S.M. et al., "Invariant Object Recognition in the Visual System with Novel Views of 3D Objects," *Neural Computation,* Nov. 2002, pp. 2585-2596, vol. 14, No. 11.
Sudderth, E.B. et al., "Nonparametric Belief Propagation and Facial Appearance Estimation," AI Memo 2002-020, Dec. 2002, Artificial Intelligence Laboratory, Massachusetts Institute of Technology, Cambridge, MA, USA, eleven pages.
Thomson, A.M. et al., "Interlaminar Connections in the Neocortex," *Cerebral Cortex,* 2003, pp. 5-14, vol. 13, No. 1.
Thornton, J. et al., "Robust Character Recognition Using a Hierarchical Bayesian Network," *Proceedings of the 19$^{th}$ Australian Joint Conference on Artifical Intelligence,* 2006, pp. 1259-1264.
Tsinarakis, G.J. et al. "Modular Petri Net Based Modeling, Analysis and Synthesis of Dedicated Production Systems," *Proceedings of the 2003 IEEE International Conference on Robotics and Automation,* Sep. 14-19, 2003, pp. 3559-3564, Taipei, Taiwan.
Tsinarakis, G.J. et al. "Modular Petri Net Based Modeling, Analysis, Synthesis and Performance Evaluation of Random Topology Dedicated Production Systems," *Journal of Intelligent Manufacturing,* 2005, vol. 16, pp. 67-92.
Tsukada, M, "A Theoretical Model of the Hippocampal-Cortical Memory System Motivated by Physiological Functions in the Hippocampus", *Proceedings of the 1993 International Joint Conference on Neural Networks,* Oct. 25, 1993, pp. 1120-1123, vol. 2.
U.S. Office Action, U.S. Appl. No. 11/010,243, Jul. 12, 2007, twelve pages.
U.S. Office Action, U.S. Appl. No. 11/147,069, Jan. 9, 2009, thirty-eight pages.
U.S. Office Action, U.S. Appl. No. 11/147,069, Jan. 9, 2007, twenty-seven pages.
U.S. Office Action, U.S. Appl. No. 11/147,069, Jul. 29, 2009, forty-three pages.
U.S. Office Action, U.S. Appl. No. 11/147,069, May 15, 2008, thirty-seven pages.
U.S. Office Action, U.S. Appl. No. 11/147,069, May 29, 2007, thirty-six pages.
U.S. Office Action, U.S. Appl. No. 11/147,069, Oct. 30, 2007, thirty-four pages.
U.S. Office Action, U.S. Appl. No. 11/351,437, Aug. 23, 2007, sixteen pages.
U.S. Office Action, U.S. Appl. No. 11/351,437, Feb. 20, 2008, six pages.
U.S. Office Action, U.S. Appl. No. 11/622,447, May 28, 2008, eighteen pages.
U.S. Office Action, U.S. Appl. No. 11/622,448, Apr. 30, 2008, seventeen pages.
U.S. Office Action, U.S. Appl. No. 11/622,448, Aug. 24, 2007, nineteen pages.
U.S. Office Action, U.S. Appl. No. 11/622,454, Jun. 3, 2008, thirteen pages.
U.S. Office Action, U.S. Appl. No. 11/622,454, Mar. 30, 2009, eleven pages.
U.S. Office Action, U.S. Appl. No. 11/622,455, Apr. 21, 2010, twelve pages.
U.S. Office Action, U.S. Appl. No. 11/622,456, Mar. 20, 2009, nine pages.
U.S. Office Action, U.S. Appl. No. 11/622,456, May 7, 2008, fourteen pages.
U.S. Office Action, U.S. Appl. No. 11/622,456, Nov. 6, 2008, seven pages.
U.S. Office Action, U.S. Appl. No. 11/622,457, Apr. 21, 2009, six pages.
U.S. Office Action, U.S. Appl. No. 11/622,457, Aug. 24, 2007, ten pages.
U.S. Office Action, U.S. Appl. No. 11/622,457, May 6, 2008, fourteen pages.
U.S. Office Action, U.S. Appl. No. 11/622,457, Nov. 20, 2008, eight pages.
U.S. Office Action, U.S. Appl. No. 11/622,458, Apr. 1, 2010, sixteen pages.
U.S. Office Action, U.S. Appl. No. 11/680,197, Mar. 23, 2010, twelve pages.
U.S. Office Action, U.S. Appl. No. 11/680,197, Sep. 14, 2010, seventeen pages.
U.S. Office Action, U.S. Appl. No. 11/713,157, Mar. 31, 2010, fourteen pages.
U.S. Office Action, U.S. Appl. No. 11/945,919, Sep. 7, 2010, nineteen pages.
U.S. Office Action, U.S. Appl. No. 12/029,434, Mar. 28, 2011, twenty-four pages.
U.S. Office Action, U.S. Appl. No. 12/029,434, Nov. 8, 2011, thirty-six pages.
U.S. Office Action, U.S. Appl. No. 12/039,630, Nov. 24, 2010, ten pages.

(56) References Cited

OTHER PUBLICATIONS

U.S. Office Action, U.S. Appl. No. 12/039,652, Mar. 29, 2011, fifteen pages.
U.S. Office Action, U.S. Appl. No. 12/040,849, Feb. 3, 2011, thirteen pages.
U.S. Office Action, U.S. Appl. No. 12/040,849, Jul. 1, 2011, seventeen pages.
U.S. Office Action, U.S. Appl. No. 12/147,348, Oct. 11, 2011, thirty-four pages.
U.S. Office Action, U.S. Appl. No. 12/288,185, Sep. 15, 2010, eleven pages.
U.S. Office Action, U.S. Appl. No. 12/483,642, Apr. 26, 2012, twelve pages.
U.S. Office Action, U.S. Appl. No. 12/483,642, Aug. 10, 2012, seven pages.
U.S. Office Action, U.S. Appl. No. 12/751,808, Oct. 28, 2010, thirteen pages.
U.S. Office Action, U.S. Appl. No. 13/151,928, Aug. 2, 2011, eight pages.
U.S. Office Action, U.S. Appl. No. 13/218,194, Oct. 5, 2012, fourteen pages.
U.S. Office Action, U.S. Appl. No. 13/227,355, May 25, 2012, twenty-four pages.
U.S. Office Action, U.S. Appl. No. 13/333,865, May 16, 2012, twenty-four pages.
Van Essen, D.C. et al., "Information Processing Strategies and Pathways in the Primate Visual System," *An Introduction to Neural and Electronic Networks,* 1995, pp. 45-76, Academic Press, Zornetzer et al., eds.
Vaught, T.N., "Software Design in Scientific Computing," Jun. 23, 2008, Numenta HTM Workshop, Jun. 23-24, 2008, SRI Campus, Menlo Park, CA, thirty-two pages.
Vlajic, "Vector Quantization of Images Using Modified Adaptive Resonance Algorithm for Hierarchical Clustering," *IEEE Transactions on Neural Networks,* 2001, pp. 1147-1162, vol. 12, No. 5.
Weiss, R. et al., "HyPursuit: A Hierarchical Network Search Engine that Exploits Content-Link Hypertext Clustering," *Proceedings of the Seventh Annual ACM Conference on Hypertext,* Mar. 16-20, 1996, pp. 180-193, Washington, D.C., USA.
Wiskott, L. et al., "Slow Feature Analysis: Unsupervised Learning of Invariances," *Neural Computation,* 2002, pp. 715-770, vol. 14, No. 4.
Wu, G. et al., "Multi-camera Spatio-temporal Fusion and Biased Sequence-data Learning for Security Surveillance," *Association for Computing Machinery,* 2003, pp. 528-538.
Yedidia, J.S. et al., "Understanding Belief Propagation and its Generalizations," *Joint Conference on Artificial Intelligence (IJCAI 2001),* Aug. 4-10, 2001, Seattle, WA, USA, thirty-five pages.
Zemel, R.S., "Cortical Belief Networks," *Computational Models for Neuroscience,* 2003, pp. 267-287, Hecht-Nielsen, R. et al., eds., Springer-Verlag, New York.

\* cited by examiner

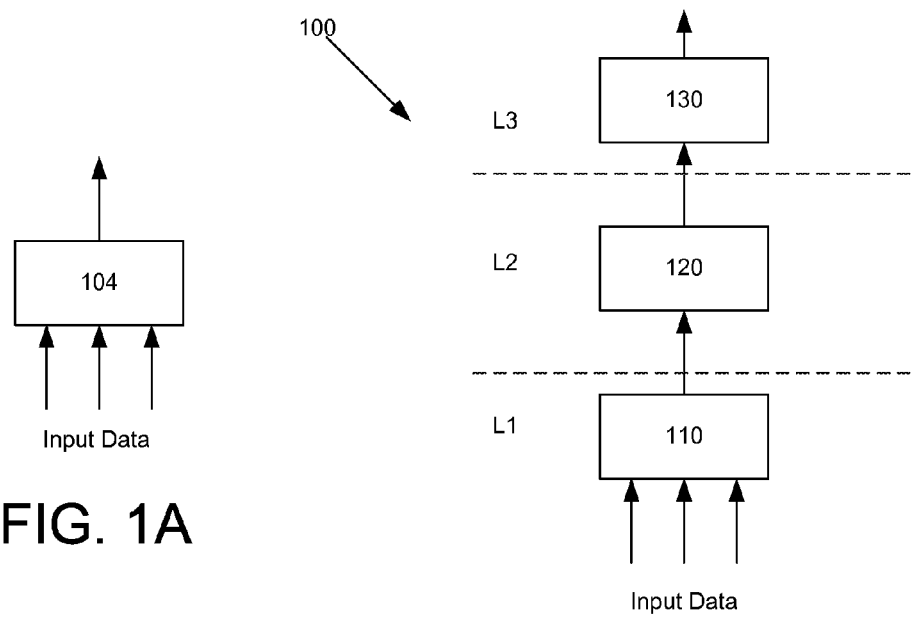
FIG. 1A
FIG. 1B
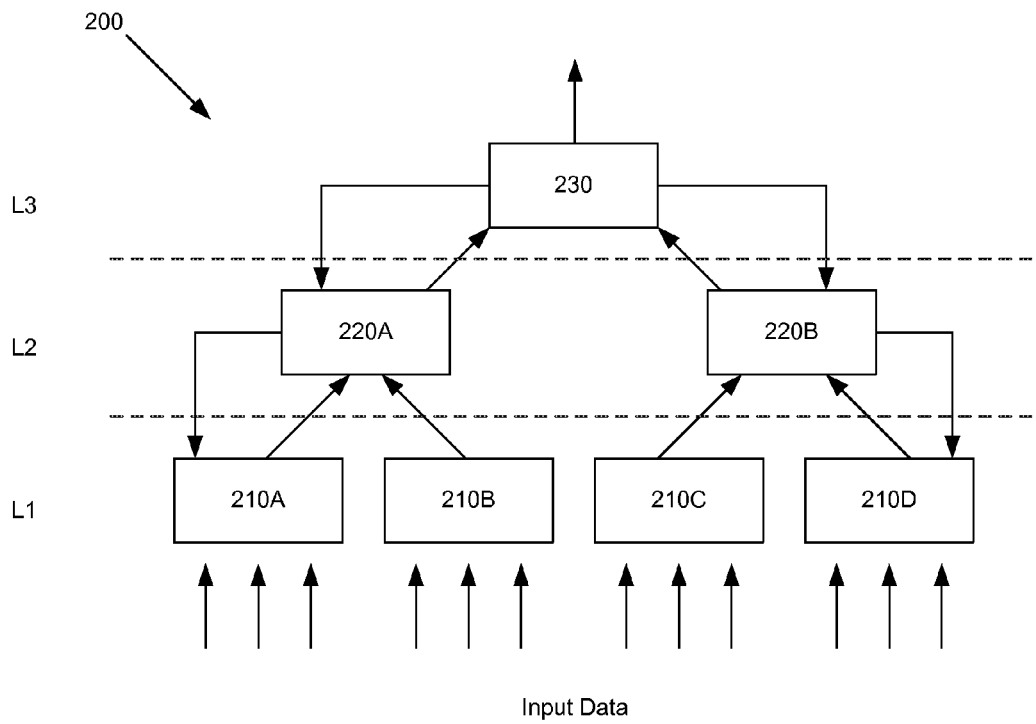
FIG. 2

PERFORMING MULTISTEP PREDICTION USING SPATIAL AND TEMPORAL MEMORY SYSTEM

BACKGROUND

1. Field of the Disclosure

Embodiments relate to making predictions using spatial patterns and temporal sequences learned by a spatial and temporal memory system, and more specifically to making predictions for values, states or distribution of values to follow multiple time steps after a current time using the spatial and temporal memory system.

2. Description of the Related Arts

Predictive analytics refers to a variety of techniques for modeling and data mining current and past data sets to make predictions. Predictive analytics allows for the generation of predictive models by identifying patterns in the data sets. Generally, the predictive models establish relationships or correlations between various data fields in the data sets. Using the predictive models, a user can predict the outcome or characteristics of a transaction or event based on available data. For example, predictive models for credit scoring in financial services factor in a customer's credit history and data to predict the likeliness that the customer will default on a loan.

Commercially available products for predictive analytics include products from IBM SSPS, KXEN, FICO, TIBCO, Portrait, Angoss, and Predixion Software, just to name a few. These software products use one or more statistical techniques such as regression models, discrete choice models, time series models and other machine learning techniques to generate useful predictive models. These software products generate different predictive models having different accuracies and characteristics depending on, among others, the amount of training data and available resources.

Each of these software products has different capabilities and requirements. Most of these software products involve an extensive amount of user configuration to product predictive models that is suitable for use. Such user configuration involves much time and experience on the part of users. In order to implement some advanced features, various complicated user operations and configurations are typically needed.

SUMMARY

Embodiments are related to making predictions for a value, a state or distribution of values to appear multiple time steps after a current time by storing relationships between states of a predictive system at earlier times and spatial patterns derived from input data of the predictive system at later times. Each of the earlier times precedes a corresponding one of the later times by a plurality of time steps. A prediction for a subsequent time following the current time after the plurality of time steps is generated based on the stored relationships and the detected state of the predictive system at a current time.

In one embodiment, the states of the predictive system at the earlier times are mapped to the spatial patterns at the later times.

In one embodiment, the spatial patterns include encoded versions of the input data in a distributed representation form.

In one embodiment, the encoded version of the input data is fed to a spatial pooler of the predictive system for pooling spatial patterns in the input data.

In one embodiment, the prediction is distribution of likelihood of values or range of values in the input data at the subsequent time.

In one embodiment, the encoded version of the input data is spatially pooled to generate sparse vectors in a sparse distributed representation form by a spatial pooler of the predictive system. The transitions of the sparse vectors are processed to establish relationships between temporal sequences of spatial patterns in the input data by a sequence processor of the predictive system. The states of the predictive system include states of the sequence processors.

In one embodiment, the predictive system stores relationships of activation states of columns of cells of the sequence processor connected with other cells in other columns of the sequence processor.

BRIEF DESCRIPTION OF THE DRAWINGS

The teachings of the embodiments of the present invention can be readily understood by considering the following detailed description in conjunction with the accompanying drawings.

FIG. 1A is a conceptual diagram of a single processing node in a non-hierarchical system, according to one embodiment.

FIG. 1B is a conceptual diagram illustrating a hierarchical spatial and temporal memory system including three layers of processing nodes, according to one embodiment.

FIG. 2 is a conceptual diagram illustrating a hierarchical spatial and temporal memory system with multiple processing nodes at lower levels, according to one embodiment.

DETAILED DESCRIPTION OF EMBODIMENTS

Figure 3:
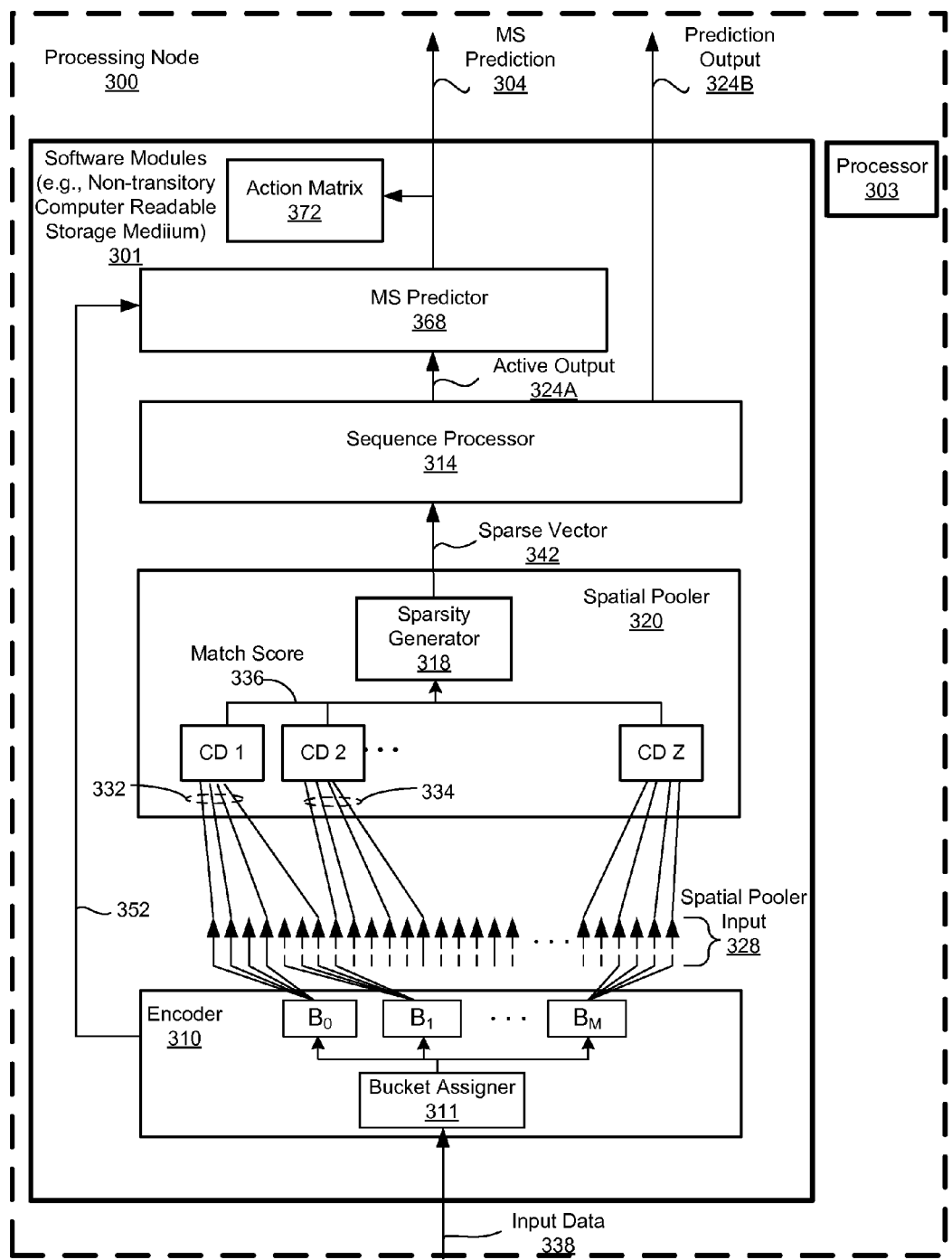
FIG. 3 is a block diagram illustrating a processing node for performing multiple time step (MS) predictions, according to one embodiment.

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements. Also in the figures, the left most digits of each reference number corresponds to the figure in which the reference number is first used.

Embodiments relate to making predictions for values or states to follow multiple time steps after a current time in a spatial and temporal memory system. While establishing relationships between the states of the spatial and temporal memory system at first times and spatial patterns derived from the input data detected at second times are determined and stored. The second times follow a plurality of time steps after the first times. While predicting, a spatial pattern to appear multiple time steps after the current time is predicted based on the stored relationship.

Multiple time steps prediction or multistep prediction herein refers to making predictions of values, states of distribution of values associated with input data to appear multiple time steps after a current time.

A time step herein refers to a unit of time during which a temporal sequence in input data of the spatial and temporal system is deemed to persist without any change. The transition of spatial pattern in the input data is detected at the end or the start of each time step. The time step can be in the units of natural time (e.g., milliseconds), processor time (e.g., clock cycles) or occurrence of events. Each time step may be defined by a constant interval or by varying intervals. The time step may also represent a unit of time taken by the spatial and temporal system to process a spatial pattern derived in an input data.

Architecture of Spatial and Temporal Memory System

A spatial and temporal memory system stores temporal relationships in sequences of spatial patterns and generates useful information based on the stored relationships. The useful information may include, for example, prediction of spatial patterns to be received, identification of temporal sequences of spatial patterns or a higher level cause associated with the sequences of spatial patterns in input data. The spatial and temporal memory system may be of a non-hierarchical structure or be of a hierarchical structure.

FIG. 1A is a conceptual diagram of a single processing node 104 in a non-hierarchical system, according to one embodiment. The processing node 104 receives input data, processes temporal sequences in the input data and generates an output. The output of the processing node 104 is based on the temporal relationships between spatial patterns. For example, the output may indicate prediction on what spatial patterns are to follow or indicate how well the prediction matched a subsequent spatial pattern in the input data.

FIG. 1B is a conceptual diagram of processing nodes organized in a hierarchical manner. Such hierarchically structured spatial and temporal memory system is referred to as a Hierarchical Temporal Memory (HTM) system. In an HTM system, multiple processing nodes learn, predict and infer input at different levels of abstraction. An example HTM system 100 of FIG. 1B comprises three levels where each level L1, L2 and L3 includes one processing node 110, 120 and 130, respectively. HTM system 100 has three levels L1, L2, L3, with level L1 being the lowest level, level L3 being the highest level, and level L2 being an intermediate level between levels L1 and L3. Processing node 110 at the lowest level L1 receives a sensed input that changes over time. Processing node 110 processes the sensed input and outputs a signal that is fed to its parent node 120 at level L2. Processing node 120 at level L2 in turn processes the signal from processing node 120 and outputs a signal to processing node 130 at the highest level L3. Processing node 120 outputs a signal that represents likely causes or events associated with the input data.

Each processing node 110, 120, 130 may perform spatial pooling and/or temporal processing, as described below in detail with reference to FIG. 3. As a result, the output signals from each processing node 110, 120, 130 are more abstract or invariant over time compared to their input signals. In one embodiment, the top node 130 generates a final output of HTM system 100 that is of the highest abstraction (e.g., likely causes or events) among the outputs generated in HTM system 100. The final output may include distributions indicating likelihood that certain causes or events are associated with the sensed input.

Some of many functions performed by a processing node include, for example, spatial pooling and temporal processing. The spatial pooling herein refers to the process of mapping a set of distinct but similar spatial patterns into a spatial co-occurrence. The temporal processing may include, but is not limited to, learning temporal sequences, performing inference, recognizing temporal sequences, predicting next elements in temporal sequences, labeling temporal sequences and temporal pooling. The learning of temporal sequences herein refers to one or more of initializing, expanding, contracting, merging and splitting temporal sequences. The prediction herein refers to assessing likelihood that certain spatial patterns will appear subsequently in the input data. The temporal pooling herein refers to processing input data to provide an output that is more stable and invariable over time compared to spatial patterns in the input data. Hardware, software, firmware or a combination thereof for performing the spatial pooling is hereinafter referred to as a spatial pooler. Hardware, software, firmware or a combination thereof for performing the temporal processing is hereinafter referred to as a sequence processor. The sequence processor may perform one or more of learning temporal sequences, performing inference, recognizing temporal sequences, predicting temporal sequences, labeling temporal sequences and temporal pooling.

In one embodiment, a processing node includes only a sequence processor or the spatial pooler. For example, nodes at the first level of the HTM system may consist of processing nodes having only spatial poolers, and the nodes at the second level of the HTM system may consist of processing nodes having only sequence processors. Processing nodes performing other functions (e.g., filtering) may also be placed within the HTM system. Alternatively, a processing node may include two or more levels of interconnected sequence processors or spatial poolers.

The processing nodes of the HTM system may be arranged so that the number of processing nodes decreases as level increases. FIG. 2 is a diagram illustrating HTM system 200 having three levels L1, L2, L3, with level L1 being the lowest level, level L3 being the highest level, and level L2 being an intermediate level between levels L1 and L3. HTM system 200 is hierarchically structured so that the processing nodes cover a larger input space as the level ascends. Level L1 has nodes 210A, 210B, 210C and 210D; level L2 has nodes 220A and 220B; and level L3 has node 230. Nodes 210A, 210B, 210C, 210D, 220A, 220B, and 230 are hierarchically connected in a tree-like structure such that each processing node has several children nodes (that is, nodes connected at a lower level) and one parent node (that is, node connected at a higher level).

Further, HTM system 200 propagates bottom-up signals up the hierarchy as well as propagates top-down signals down the hierarchy. That is, each processing node 210A, 210B, 210C, 210D, 220A, 220B, and 230 may be arranged to (i) propagate information up the HTM hierarchy to a connected parent node, and (ii) propagate information down the HTM hierarchy to any connected children nodes.

The number of levels or arrangement of processing modes in FIGS. 1 and 2 are merely illustrative. Many variants of HTM system may be developed and deployed depending on the specific application. For example, the number of levels may be increased to provide different levels of abstraction/invariance or to accommodate different types of sensed inputs (e.g., visual data and audio data). Further, a parent node may also receive partially overlapping bottom-up signals from multiple children nodes. An external supervision signal may also be fed to each of the processing nodes to enhance spatial and/or temporal processing performance.

In one embodiment, one or more nodes of the spatial and temporal memory system receives sensed inputs representing images, videos, audio signals, sensor signals, data related to network traffic, financial transaction data, communication signals (e.g., emails, text messages and instant messages), documents, insurance records, biometric information, parameters for manufacturing process (e.g., semiconductor fabrication parameters), inventory patterns, energy or power usage patterns, data representing genes, results of scientific experiments or parameters associated with operation of a machine (e.g., vehicle operation) and medical treatment data. The spatial and temporal memory system may process such inputs and produce an output representing, among others, identification of objects shown in an image, identification of recognized gestures, classification of digital images as pornographic or non-pornographic, identification of email messages as unsolicited bulk email ('spam') or legitimate email ('non-spam'), prediction of a trend in financial market, prediction of failures in a large-scale power system, identification of a speaker in an audio recording, classification of loan applicants as good or bad credit risks, identification of network traffic as malicious or benign, identity of a person appearing in the image, processed natural language processing, weather forecast results, patterns of a person's behavior, control signals for machines (e.g., automatic vehicle navigation), gene expression and protein interactions, analytic information on access to resources on a network, parameters for optimizing a manufacturing process, predicted inventory, predicted energy usage in a building or facility, web analytics (e.g., predicting which link or advertisement that users are likely to click), identification of anomalous patterns in insurance records, prediction on results of experiments, indication of illness that a person is likely to experience, selection of contents that may be of interest to a user, indication on prediction of a person's behavior (e.g., ticket purchase, no-show behavior), prediction on election, prediction/detection of adverse events, a string of texts in the image, indication representing topic in text, and a summary of text or prediction on reaction to medical treatments. The underlying representation (e.g., photo, audio and etc.) can be stored in a non-transitory storage medium.

Example Structure and Operation of Processing Node

FIG. 3 is a block diagram illustrating processing node 300 in a spatial and temporal memory system, according to one embodiment. The processing node 300 may be a stand-alone node for operating without other processing nodes. Alternatively, the processing node 300 may be part of a hierarchy of processing nodes, for example, as described above in detail with reference to FIGS. 1B and 2.

Processing node 300 may include, among other components, an action matrix 372, multiple time steps (MS) predictor 368, sequence processor 314, spatial pooler 320 and encoder 310. In one embodiment, processing node 300 is a combination of hardware and software. Processing node 300 may include a processor 303 for executing instructions and software modules 301 for storing instructions for one or more functions of components as illustrated in FIG. 3.

Encoder 310 receives input data 338 and encodes the input data 338 into spatial pooler input 328. Spatial pooler input 328 is one type of spatial pattern derived from the input data 338 and is in a distributed representation form suitable for further processing at processing node 300 using various types of encoding schemes, as described, for example in U.S. patent application Ser. No. 13/218,170, entitled "Encoding of Data for Processing in a Spatial and Temporal Memory System," filed on Aug. 25, 2011, which is incorporated by reference herein in its entirety. Specifically, encoder 310 may receive data of various types (e.g., enumerated types, scalar data and a hybrid thereof) and convert these data into spatial pooler input 328 in a distributed representation. In case the input data 338 includes multiple data fields, encoder 310 may apply a different coding scheme for each data field and concatenate the converted data into a single spatial pooler input 328.

In one embodiment, encoder 310 includes bucket assigner 311 that receives input data 338 and activates one or more buckets $B_0$ through $B_M$. An example assignment of assigning buckets $B_0$ through $B_M$ to a scalar value is described below in detail with reference to FIG. 10A. Buckets $B_0$ through $B_M$ may partly overlap in terms of the mapped scalar value. For example, a single scalar value may active two or more buckets. Each of the buckets $B_0$ through $B_M$ may be associated with a plurality of elements in spatial pooler input 328. When a bucket turns active, elements of the spatial pooler input 328 associated with the bucket also turns active. In the example of FIG. 3, bucket $B_0$ is active (indicated by solid arrows) whereas bucket $B_1$ and $B_M$ are inactive (indicated by dashed arrows). Encoder also sends active bucket information 352 indicating which buckets are active to MS predictor 368. For example, active bucket information of (1, 0, 0, 0, 0) indicates that the first bucket is active whereas the other four buckets are inactive. Bucket information 352 is another type of spatial pattern derived from the input data 338.

If the processing node 300 forms a non-hierarchical system or is a lowest node of a hierarchical system, the input data 338 may be sensed input. If the processing node 300 is a node at an intermediate level or a top level of a hierarchical system, the input data 338 may be an output from a child node or children nodes.

Spatial pooler 320 performs spatial pooling by producing sparse vector 342 in sparse distributed representation. In a sparse distributed representation, a number of elements in the sparse vector 342 are inactive (e.g., assigned a value of zero) while the remaining elements are active (e.g., assigned a value of one). Referring to FIG. 3, spatial pooler 320 includes, among other components, a sparsity generator 318 and a plurality of co-occurrence detectors (CDs) 1 through Z. CDs detect co-occurrences in spatial pooler input 328, and generate match scores 336. Match scores 336 indicate the degree of match between a spatial pattern of the spatial pooler input 328 and a co-occurrence pattern associated with each CD. In one embodiment, a higher match score indicates more overlap between spatial pooler input 328 and the associated co-occurrence pattern of each CD. The match scores 336 are provided to sparsity generator 318. In response, sparsity generator 318 generates sparse vector 342 in sparse distributed representation.

In one embodiment, each CD is mapped to a subset of elements in the spatial pooler input 328 within a predefined input range. As illustrated in FIG. 3 by lines extending from CD 1 to a subset of arrows of spatial pooler input 328, CD 1 is mapped to receive a subset 332 of elements of the spatial pooler input 328. Similarly, CD 2 is mapped to receive a subset 334 of elements of the spatial pooler input 328.

Sparsity generator 318 collects the match scores 336 from the CDs, selects a number of CDs satisfying conditions based on their match scores and match scores of nearby CDs to generate sparse vector 342. In one embodiment, when a CD becomes dominant (i.e., the CD has a high match score), the CD inhibits selection of other CDs within a predetermined range (hereinafter referred to as "an inhibition range"). The inhibition range may extend only to CDs immediately adjacent to the dominant CD or may extend to CDs that are separated from the dominant CD by a predetermined distance. Alternatively, sparsity generator 318 may select a subset of CDs with highest match scores among all CDs in the processing node.

Sequence processor 314 performs temporal processing based on sparse vector 342, and generates active output 324A and predictive output 324B. Active output 324A and predictive output 324B collectively represent activation state of columns, cells and/or temporal memory segments of the cells in the sequence processor 314, as described below in detail with FIG. 4A.

MS predictor 368 generates MS prediction 304 indicating a state, value, or distribution of likelihood of values predicted to take place multiple time steps in the future based on active output 324A. Active output 324A indicates the current activation state of the sequence processor 314. MS predictor 368 stores the relationships between the active outputs 324A and future active bucket information 452, and uses the stored relationships to generate and output MS prediction 304, as described below in detail with reference to FIGS. 5 and 6. MS prediction 304 indicates a value or a state predicted to take place multiple time steps in the future and is to be distinguished from predictive output 324B indicating a predicted value or state in a time step immediately after the current time step.

Action matrix 372 recommends actions based on MS prediction 304. Depending on predicted value, state or distribution of values (as represented by MS prediction 304), different actions may be recommended. In case where MS prediction 304 includes distribution indicative of likelihood of values, the action to be recommended can be defined in action matrix 372 as a function of likelihood of predicted values. In one embodiment, action matrix 372 simply recommends an action in anticipation of the most likely value that is likely to occur multiple time steps in the future. In other embodiments, however, action matrix 372 takes into account the significance associated with certain values as well as the predicted likelihood of input data taking such values to recommend actions. For example, if the effect of the input data taking a certain value outweighs the effect of the input data taking another value, action matrix 372 may recommend an action in anticipation of input data taking the certain value even thought the likelihood of this is relatively low (e.g., less than 20%) compared to the likelihood of the input data taking the other value (e.g., more than 80%). By using action matrix 372, a user's value assessment on predicted values may be taken into account in recommending actions.

Figure 4A:
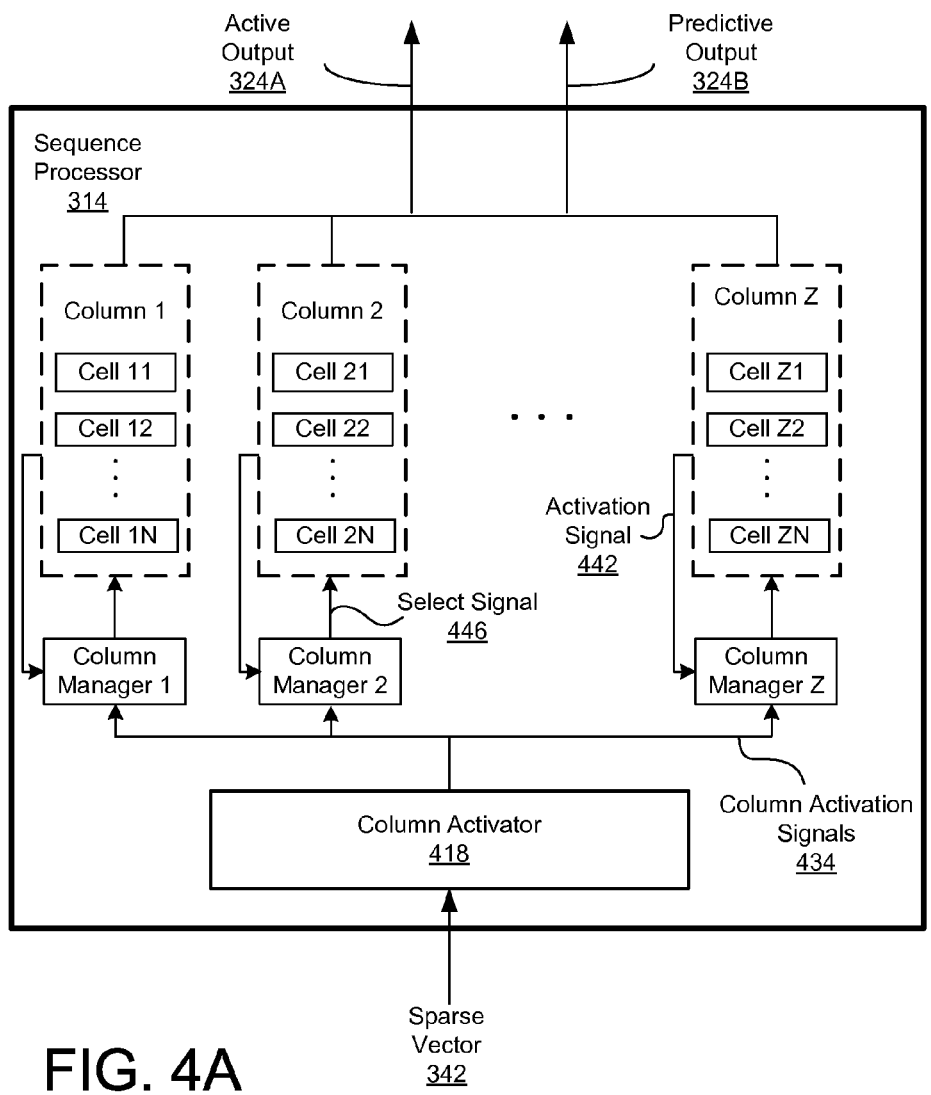
FIG. 4A is a block diagram illustrating a sequence processor in the processing node of FIG. 3, according to one embodiment.

FIG. 4A is a block diagram illustrating sequence processor 314, according to one embodiment. Sequence processor 314 learns and stores transitions between spatial patterns represented as sparse vector 342 over time by establishing connections between cells and, for each cell, storing activation states of other connected cells that precede its activation. Based on the learned transitions, sequence processor 314 recognizes and predicts the same or similar transitions in the input signal by monitoring the activation states of its cells.

Sequence processor 314 may include, among other components, columns of cells (in dashed boxes), column managers and column activator 418. Column activator 418 receives sparse vector 342 from spatial pooler 320. In response, column activator 418 generates column activation signals 434 indicating which columns are to be activated based on sparse vector 342. The column activator 418 receives sparse vector 342 and determines which elements of sparse vector 342 are active. Then, column activator 418 sends column activation signals 434 to corresponding columns to activate cells in these columns. Each column is connected to an associated column manager. The column manager receives the column activation signal 434, determines activation states of cells in the column (based on activation signal 442), and sends select signal 446 to activate one or more cells in the column under certain circumstances.

In one embodiment, sequence processor 314 may learn, store and detect temporal sequences while performing inference, prediction or other temporal processing (also referred to as "online learning" herein). The online learning collapses a learning (or training) phase and a temporal processing (e.g., predicting) phase into a single phase.

Example embodiments of processing node 300 described above with reference to FIGS. 3 and 4A are merely illustrative. Other types of processing nodes using a different algorithm or operating principle to process spatial patterns and temporal sequences may be adopted. For example, a processing node may implement an algorithm described, for example, in U.S. Pat. No. 8,037,010, entitled "Spatio-Temporal Learning Algorithms in Hierarchical Temporal Networks," issued on Oct. 11, 2011, which is incorporated by reference herein in its entirety. The same or similar principles of MS prediction described herein may be applied to the processing mode implementing different algorithms for processing spatial patterns and temporal sequences.

Example Structure of Cells

One or more cells are included in each column. The cells may be activated by select signals 446 at the current time step (hereinafter referred to as "non-predictive" activation) or by receiving sequence inputs from other connected cells (hereinafter referred to as "predictive" activation). The sequence inputs represent the activation states of cells in columns other than the column in which a particular cell belongs, and can be used to activate the particular cell based on the activation of cells in the other columns. The cells individually, or collectively as a column, send active output 324A and prediction output 324B to MS predictor 368.

Figure 4B:
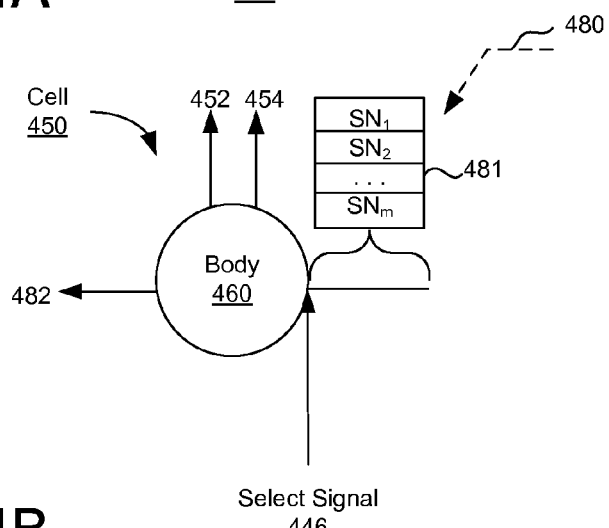
FIG. 4B is a conceptual diagram illustrating a structure of a cell, according to one embodiment.

FIG. 4B is a conceptual diagram illustrating signals associated with a cell 450, according to one embodiment. Cell 450 receives sequence inputs 480 and select signal 446. Sequence inputs 480 are collective sequence outputs sent out by other cells having connections with cell 450. Cell 450 establishes connections with the other cells during learning to monitor the activation states of the other cells. Cell 450 also receives select signal 446 which becomes active when: (i) the column including cell 450 is activated by column activation signal 434, and (ii) cell 450 is selected to learn activation states of other cells. After activation, cell 450 also sends a sequence output 482 to other cells. The sequence output 482 in conjunction with the sequence output from other cells form sequence inputs for other cells.

Cell 450 generates non-predictive cell output 452 and predictive cell output 454. Non-predictive cell output 452 is generated when the cell 450 is activated in response to select signal 446 (which is in turn generated in response to column activation signals 434). Non-predictive cell output 452 in conjunction with non-predictive cell outputs from other cells form active output 402 representing non-predictive activation of cells at a current time step. Predictive cell output 454 is generated when the cell 450 is activated in response to sequence inputs 480. Predictive cell output 454 in conjunction with predictive cell outputs from other cells form prediction output 404 representing predictive activation of cells based on the sequence inputs.

Cell 450 includes a table 481 storing sets of activation states upon activation of cell 450. Each of the entries $SN_1$ through $SN_m$ correspond to a set of activation state of cells connected to cell 450 when cell 450 was activated. When the sequence inputs 480 indicate activation states of other cells that match totally or partially with one set of activation states as stored in an entry of table 481, cell 450 body 460 outputs predictive cell output 454.

In one embodiment, entries in table 481 store identifications of a subset of cells active when cell 450 was first activated. The five cells may be a subset of fifty cells that were active when cell 450 was activated. The cells for storing information about the vector may be selected randomly or based on certain criteria.

As multiple vectors are detected, a list of vectors may be generated for the selected cell. After learning, the cell is activated when sequence input includes a vector that completely matches with one of the list of vectors that the cell is storing or the number/percentage of elements matching the list of vectors exceed a threshold.

Example MS Predictor Operation

In various applications, it is advantageous to make a prediction on values or states multiple time steps in the future. For example, an event may involve making preparations multiple time steps ahead. By making predictions for events or values multiple time steps ahead of time, benefit associated with the events or values can be increased while costs associated with the events or values may be reduced. However, predictive output 324B generated by the sequence processor 314 of a spatial and temporal memory system generally indicates a value or a state at a future time that is one time step after a current time. MS predictor 368 establishes the relationships between input data or its encoded version with the states of the spatial and temporal memory system, and then uses the relationships to determine a value or a state predicted to occur multiple time steps in the future.

Figure 5:
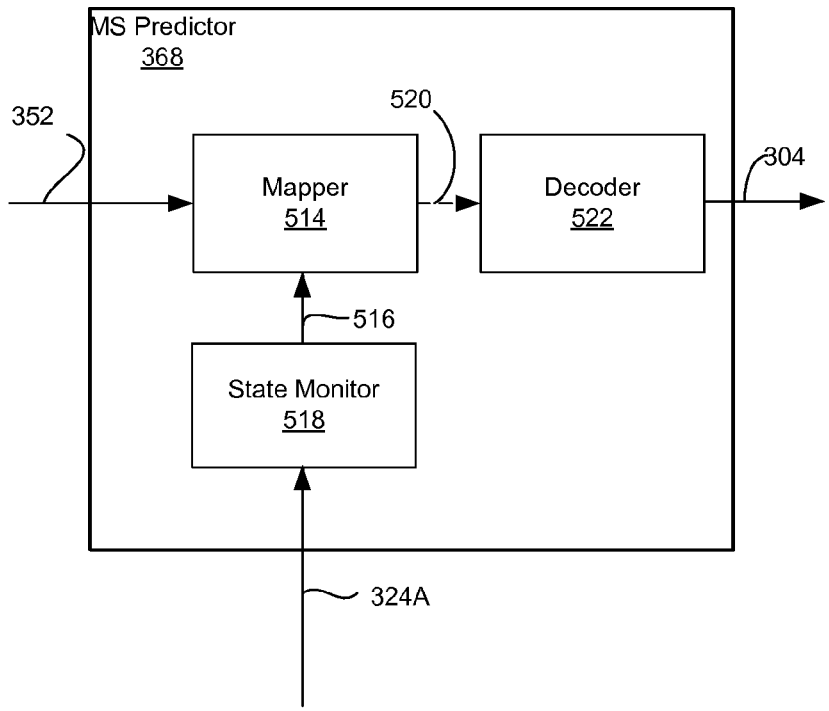
FIG. 5 is a block diagram illustrating multiple time steps (MS) predictor, according to one embodiment.

FIG. 5 is a block diagram illustrating MS predictor 368, according to one embodiment. MS predictor 368 may include, among other components, mapper 514, state monitor 518 and decoder 522. State monitor 518 interfaces with sequence processor 314 to retrieve active output 324A or other information indicating the state of sequence processor 314. As set forth above with reference to FIG. 4B, active output 324A indicates non-predictive activation of cells in sequence processor 314. In addition to or in lieu of active output 324A, state monitor 518 may retrieve activation states of columns and/or the temporal memory segments of the cells that cause the cells to activate.

In a training stage, mapper 514 receives active bucket information 352 and stores active bucket information 352 over a number of time steps. Mapper 514 also receives state information 516 that indicates the state of sequence processor 314 and/or the spatial pooler 320 and determines relationships between future active bucket information and the past states of sequence processor 314 and/or the spatial pooler 320 received over time. State information 516 may include, for example, the active output 324A, other information indicating the state of sequence processor 314 or state of the spatial pooler 320. Embodiments are described below using examples where only active output 324A is used as state information 516 for the sake of simplification but additional or alternative information may also be used as state information 516.

In a prediction stage, mapper 514 receives active output 324A at a current time (e.g., time t) and identifies active bucket information mapped to the received active output. In a simplified version, the identified bucket information becomes the predicted bucket information 520 indicating the buckets to become active multiple times steps (n) in the future (e.g., at time t+n).

Figure 6:
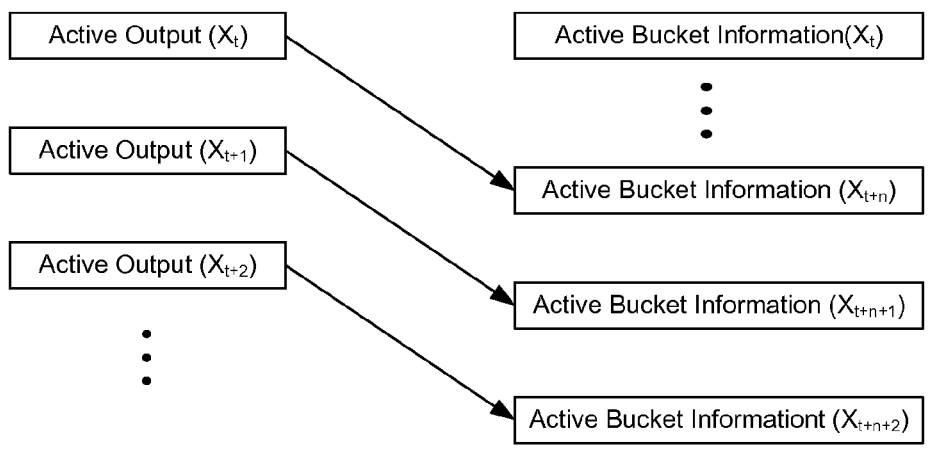
FIG. 6 is a conceptual diagram illustrating the process of mapping of active outputs and active bucket information, according to one embodiment.

FIG. 6 is a conceptual diagram illustrating mapping of active outputs 324A to active bucket information 352, according to one embodiment. As mapper 514 receives active outputs 324A and active bucket information 352 over multiple time steps in the training stage. Each active output 324A at a predetermined time (e.g., time t, time (t+1), etc.) is mapped to active bucket information 352 that is generated "n" time steps after the predetermined time (e.g., time (t+n), time (t+n+1), etc.), where "n" may be multiples of the time step.

After mapper 514 is at least partially trained, mapper 514 performs MS prediction by identifying spatial pooler input mapped to active output received at the current time step, as described below in detail with reference to FIG. 9.

In one embodiment, the mapping of the active outputs to spatial pooler inputs is performed on a rolling basis, deleting the mapping of the active output received over a threshold amount of time ago. It is also possible to perform the training and prediction at MS predictor 368 simultaneously (i.e., online training) by continuously performing updating of the mapping while MS predictor 368 performs MS prediction. In another embodiment, the training stage and the prediction stage of MS predictor 368 may be separate and distinct.

Figure 10A:
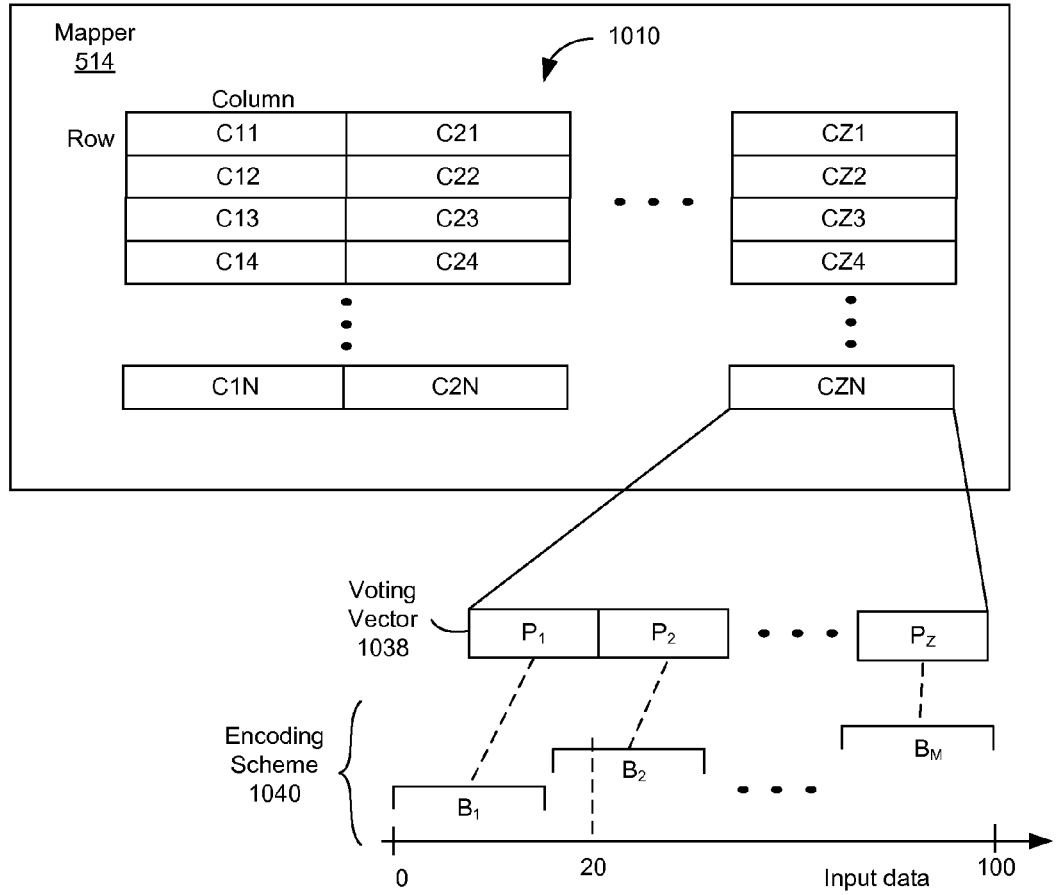
FIG. 10A is a conceptual diagram illustrating a data structure for storing relationships between the states of spatial and temporal memory system and active bucket information, according to one embodiment.

In practice, however, the amount of information and processing resources to store and process the mapping of FIG. 6 may be excessive. In one or more embodiments, the mapping of active outputs 324A and future active buckets are converted into relationships between active outputs 324A and active bucket information that is more efficient and compact, as illustrated in FIG. 10A. In such embodiments, the predicted bucket information 520 may be a distribution of values indicating likelihood that buckets $B_0$ through $B_M$ are to become active multiple times steps in the future. For example, predicted bucket information 520 may be in a form of a vector $(a_1, a_2, \ldots, a_M)$ where each element indicates relative likelihood of a corresponding bucket becoming active multiple time steps in the future. Alternatively, the predicted bucket information 520 may be a single value indicating a bucket that is most likely to be active multiple time steps in the future.

Decoder 522 performs decoding of predicted bucket information 520 to generate MS prediction 304. For this purpose, decoder 522 executes a reverse algorithm of encoding performed at encoder 310. In case where spatial pooler input 328 includes multiple distinct fields of information, decoder 522 may perform decoding for one or more fields of interest instead of decoding all the fields in spatial pooler input 328. As a result of decoding, the decoded fields in MS prediction 304 are expressed in the same unit or format as the corresponding fields of input data 338. In an alternative embodiment, predicted bucket information 520 may be output as MS prediction 304 without decoding predicted bucket information 520.

Although embodiments described above with reference to FIGS. 5 and 6 use only active output 324 (indicating non-predictive activation of cells) as the state of sequence processor 314 for mapping to active bucket information 352, the activation states of columns in sequence processor 314 may be used as information indicating the state of sequence processor 314 at coarser granularity compared to active output 324. Alternatively, information indicating a specific set of activation state of connected cells that cause a cell to become predictively activated may be used as information indicating the state of sequence processor 314 at finer granularity compared to active output 324. Also, any combinations of column activation states, non-predictive cell activation states, predictive cell activation states, and temporal segments that cause cells to activate may be used as information indicting the state of sequence processor 314. Using information of a finer granularity to indicate the state of sequence processor 314 may be advantageous when the use of information of coarser granularity causes mapping of the same state of the sequence processor 314 to two or more different spatial pooler inputs.

Further, instead of mapping the active output 324A to active bucket information, MS predictor 368 may map the state of spatial pooler 320 to future active bucket information. For example, the identification on selected CDs based on match scores 336 at a time step may be mapped to active bucket information multiple time steps in the future. In such embodiment, sequence processor 314 may be omitted. However, MS prediction based on the state of sequence processor 314 tends to be more accurate than MS prediction based on the state of spatial pooler 320 since MS prediction based on the state of sequence processor 314 can take into account a Markov model that is higher in order compared to MS predictions based on the state of spatial pooler 320.

Example Process of Performing Multistep Prediction

Figure 7:
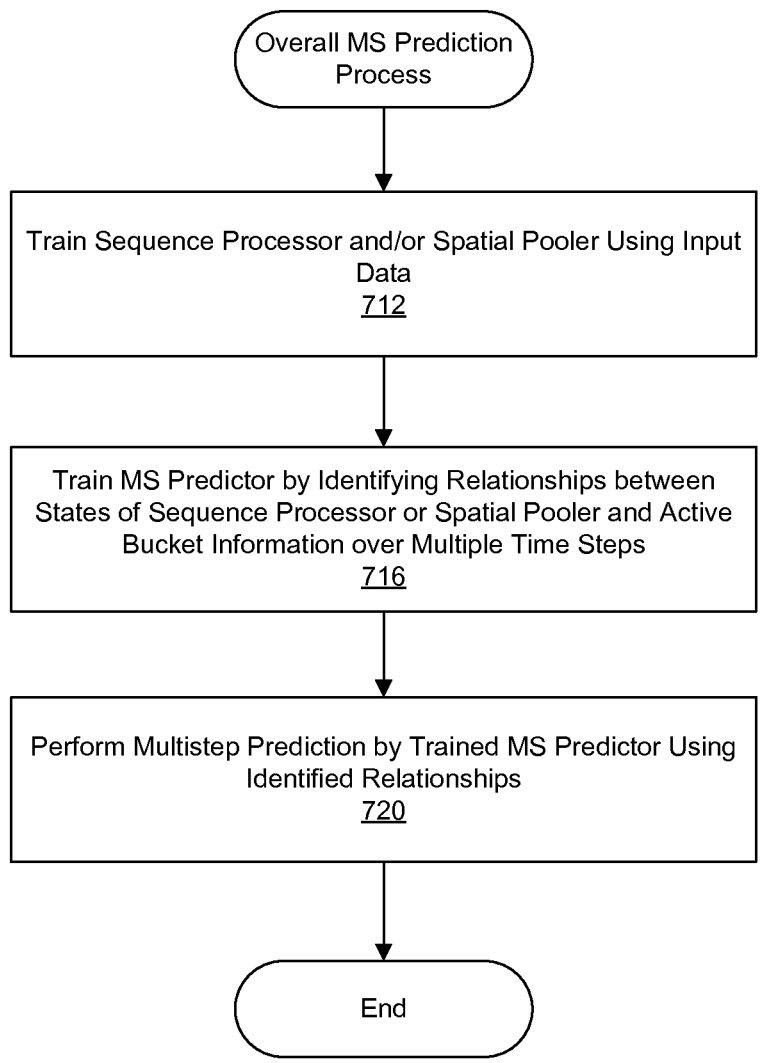
FIG. 7 is a flowchart illustrating the process of an overall process of making MS prediction, according to one embodiment.

FIG. 7 is a flowchart illustrating an overall process of making MS prediction, according to one embodiment. Sequence processor 314 and/or spatial pooler 320 are first trained 712 using input data 338. The training may include exposing spatial pooler 320 to a series of spatial pooler inputs 328 and sequence processor 314 to a series of sparse vectors 342. As a result, the spatial pooler 320 learns spatial patterns in the input data and produces sparse vectors 342 corresponding to sparse pooler inputs 328. Sequence processor 314 receives sparse vectors 342 and produces active output 324A and predictive output 324B while undergoing changes in its internal states (e.g., activation of cells).

MS predictor 368 is trained 716 by identifying relationships between the states of sequence processor 314 (or spatial pooler 320) and active bucket information 352 over multiple time steps, as described below in detail with reference to FIG. 8. In one or more embodiments, the states of sequence processor 314 are represented by active outputs 324A.

After training MS predictor 368, MS prediction is performed 720 using the identified relationships between the states of sequence processor 314 (or spatial pooler 320) and active bucket information 352, as described below in detail with reference to FIG. 9.

In one embodiment, one or more steps of training 712 sequence processor 314 through performing 720 of MS prediction are performed simultaneously. That is, online learning is performed for the training of sequence processor 314, spatial pooler 320 and/or MS predictor 368.

Figure 8:
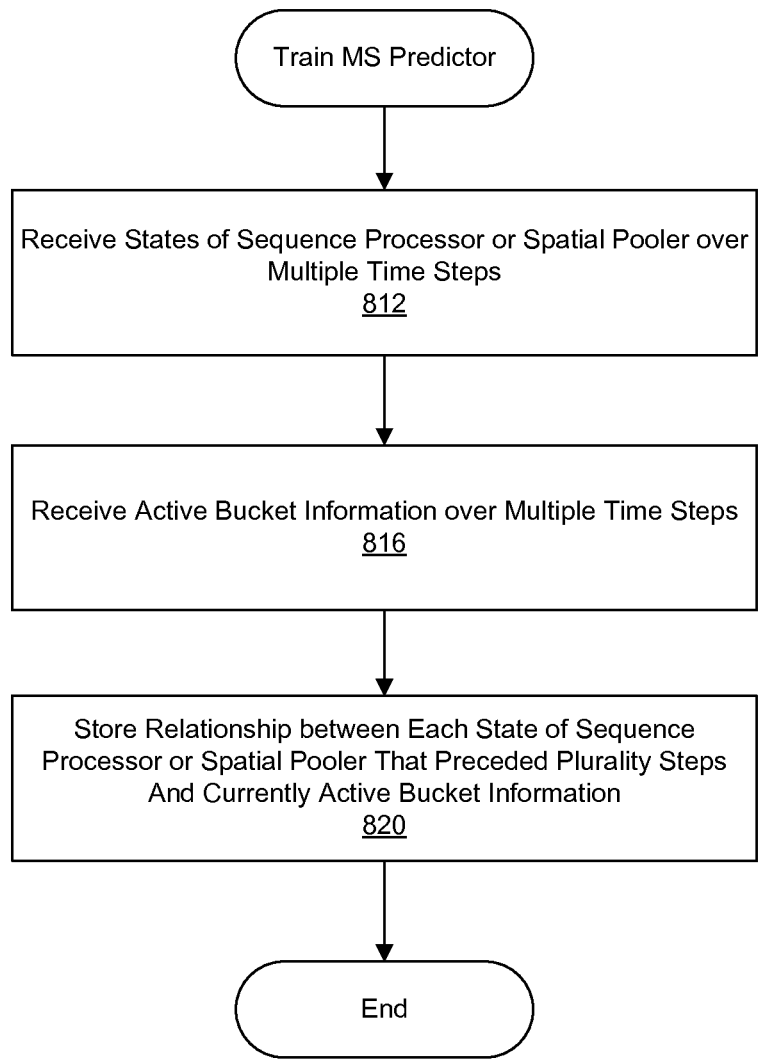
FIG. 8 is a flowchart illustrating the process of training a MS predictor, according to one embodiment.

FIG. 8 is a flowchart illustrating the process of training MS predictor 368, according to one embodiment. MS predictor 368 receives 812 states of sequence processor 314 (e.g., active outputs 324A) (or states of spatial pooler 320) over multiple time steps, and stores the states of sequence processor 314 or states of spatial pooler 320 for associating with active bucket information 352 to be received at later times. MS predictor 368 receives 816 active bucket information 352 over multiple time steps.

Relationship between each state of sequence processor 314 or spatial pooler 320 received at a plurality of time steps before and current active bucket information 352 is then stored. An example method of storing the relationships between the states of sequence processor 314 or spatial pooler 320 and active bucket information 352 is described below in detail with reference to FIGS. 10A and 10B.

Figure 9:
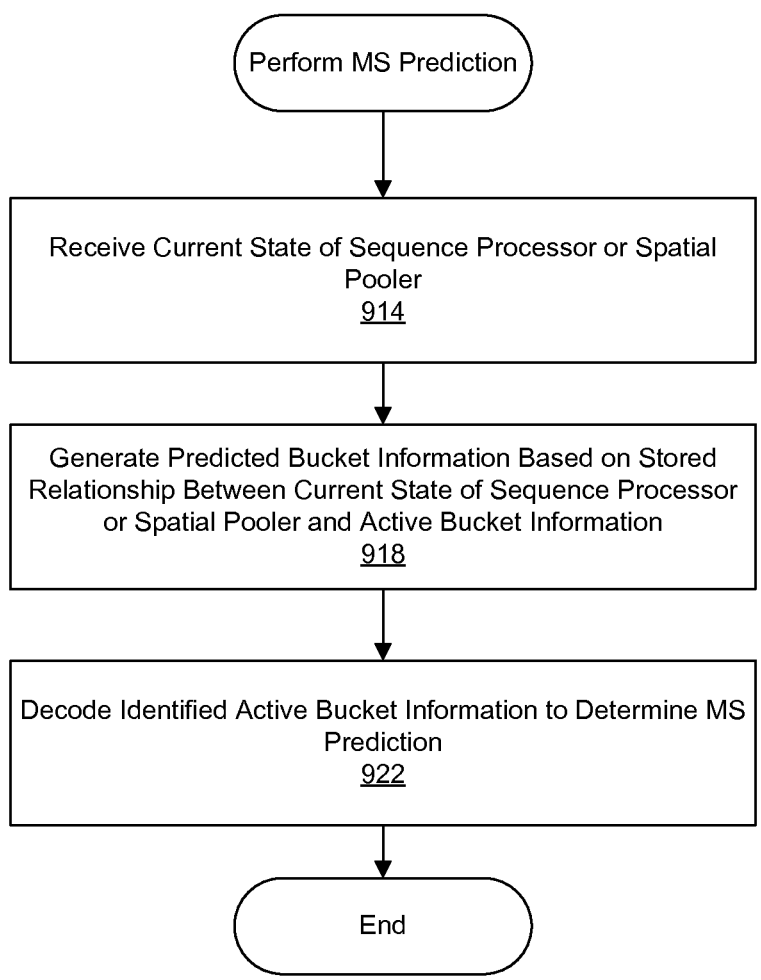
FIG. 9 a flowchart illustrating the process of performing a MS prediction in a trained MS predictor, according to one embodiment.

FIG. 9 is a flowchart illustrating the process of performing MS prediction in MS predictor 368, according to one embodiment. MS predictor 368 receives 914 the current state of sequence processor 314 (or spatial pooler 320). The current state of sequence processor 314 may be in the form of active output 324A received from sequence processor 314.

Based on stored relationships between the states of sequence processor 314 (or spatial pooler 320) and active bucket information 352, MS predictor 368 generates 918 predicted bucket information 520. An example method of generating predicted bucket information 520 is described below in detail with reference to FIGS. 10A and 10C.

The predicted bucket information 520 is then decoded 922 to generate MS prediction 304. In one or more embodiments, a subset of fields in the identified spatial pooler input is decoded instead of the entire spatial pooler input to produce MS predictor 368.

Example methods of performing MS prediction described above in detail with reference to FIGS. 7 through 9 can be automated with little or no manual configurations on the operational parameters of the spatial and temporal memory system. Further, the multiple time steps may be adjusted conveniently by modifying the relationships between active outputs and active buffer information without performing other complicated reconfiguration on the spatial and temporal memory system.

Storing and Identifying Mapping Using Voting Scheme

The relationships between the states of sequence processor 314 and active buffer information 352 may be stored and retrieved using various schemes. One efficient method of storing and retrieving the relationship is through the use of a data structure having entries that store active bucket information for each cell. The data structure stores, for each cell in sequence processor 314, information on buckets $B_0$ through $B_M$ that become active multiple time steps after the cell becomes activated. The data structure efficiently coalesces the relationships between multiple different states of sequence processor 314 and the active bucket information 352 as well as facilitating generation of predicted buffer information 520 based on the stored relationships without using extensive computing resources.

FIG. 10A is a conceptual diagram illustrating data structure 1010 for storing relationships between active outputs 324A and active buffer information 352, according to one embodiment. Data structure 1010 has columns and rows of data entries C11 through CZN where each of the data entries C11 through CZN corresponds to a cell in sequence processor 314. Each of the data entries C11 through CZN includes a voting vector 1038 indicating information on buffers that become activated multiple time steps after a corresponding cell became non-predictively activated.

In one embodiment, voting vector 1038 includes elements $P_1$ through $P_Z$ each corresponding to one of the buckets $B_1$ through $B_M$. Each of the elements $P_1$ through $P_Z$ indicates likelihood that a corresponding bucket will become active multiple time steps after the cell corresponding to the data entry becomes active based on past history of cell activation and subsequent activation of the bucket. Each of the elements $P_1$ through $P_Z$ can be an integer or a real number.

Prediction bucket information 520 may be generated, for example, by combining the corresponding elements of voting vectors for all cells activated non-predictively at a current time. Taking an example where three cells (cells 2, 4 and 5) are active and the encoding scheme involves four buckets $B_1$ through $B_4$. If data entry for cell 2 is (0.4, 0.1, 0.2, 0.3), this means that the likelihood of buckets $B_1$, $B_2$, $B_3$, $B_4$ being activated multiple steps after cell 2 became active is 0.4, 0.1, 0.2, 0.3, respectively. Assume also that the data entry for cell 4 is (0.25, 0.05, 0.4, 0.3) and the data entry for cell 5 is (0.10, 0.10, 0.10, 0.70). In this example, elements in the data entries of cells 2, 4 and 5, can be added element-by-element to obtain vector (0.75, 0.25, 0.70, 1.30). This vector or its normalized version can become prediction bucket information 520.

In one embodiment, the voting weight of a cell to the prediction bucket information 520 may differ based on the confidence or frequency that particular bucket became active multiple time steps after the cell was activated. Alternatively, the data entry values of cells may be normalized so that each cell makes the same contribution to prediction bucket information 520.

In the example of FIG. 10A, input data 338 has a scalar value and is encoded by encoder 310 using encoding scheme 1040 where buckets $B_1$ through $B_M$ are activated when input data 338 falls into ranges defined by buckets $B_1$ through $B_M$. In this example, the input data takes a value between 0 and 100. If the input data has a value of 20, bucket $B_2$ becomes activated. Buckets $B_1$ through $B_M$ may partly overlap, and hence, one or more elements in the spatial pooler input may be activated in response to a single scalar input data value.

Figure 10B:
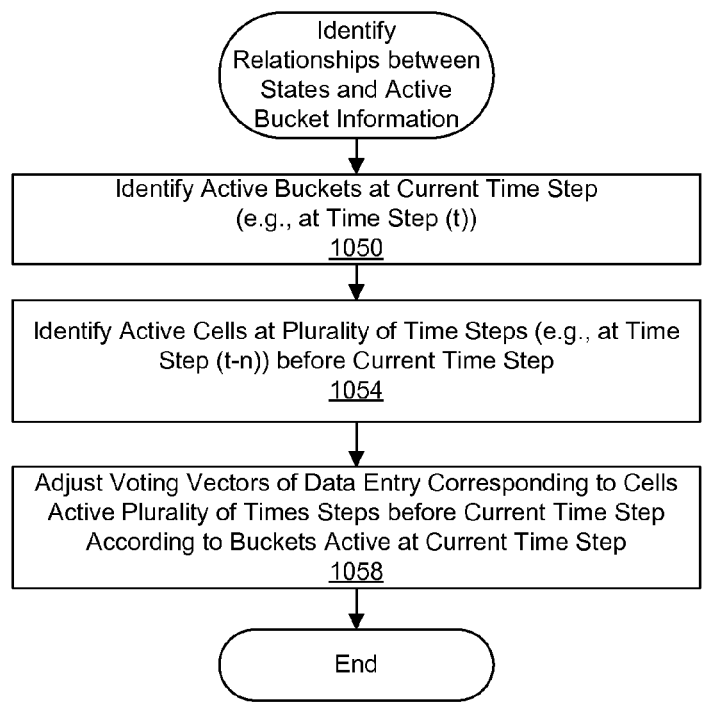
FIG. 10B is a flowchart illustrating the process of storing of mapping information, according to one embodiment.

FIG. 10B is a flowchart illustrating the process of identifying relationships between states of sequence processor 314 (or spatial pooler 320) and active bucket information 352 using data structure 1010, according to one embodiment. Buckets active at a current time step (e.g., time step (t)) are identified 1050. Non-predictive active cells in a multiple time steps in the past (e.g., time step (t−n)) are also identified 1054.

For each data entry of data structure 1010 corresponding to a cell active at multiple time steps in the past, its voting vector is adjusted 1058 according to active buckets to indicate that activation of the cell was followed by activation of these buckets after multiple time steps. Specifically, voting vector elements of entries corresponding to the buckets that are currently have their voting values increased to indicate that the prior activation of corresponding cells (e.g., at time step (t−n)) is likely to accompany activation of these buckets at a later time step. In one embodiment, all of the voting values in the voting vector elements of the voting vector 1038 are normalized.

In one embodiment, the elements in the voting vector are adjusted so that more recently detected relationships between states and the subsequent activation of buckets are given more weight compared to relationships detected earlier during training.

The step of identifying 1050 active buckets and the step of identifying 1054 active cells need not be performed in this sequence; and these two steps can be reversed in order.

Figure 10C:
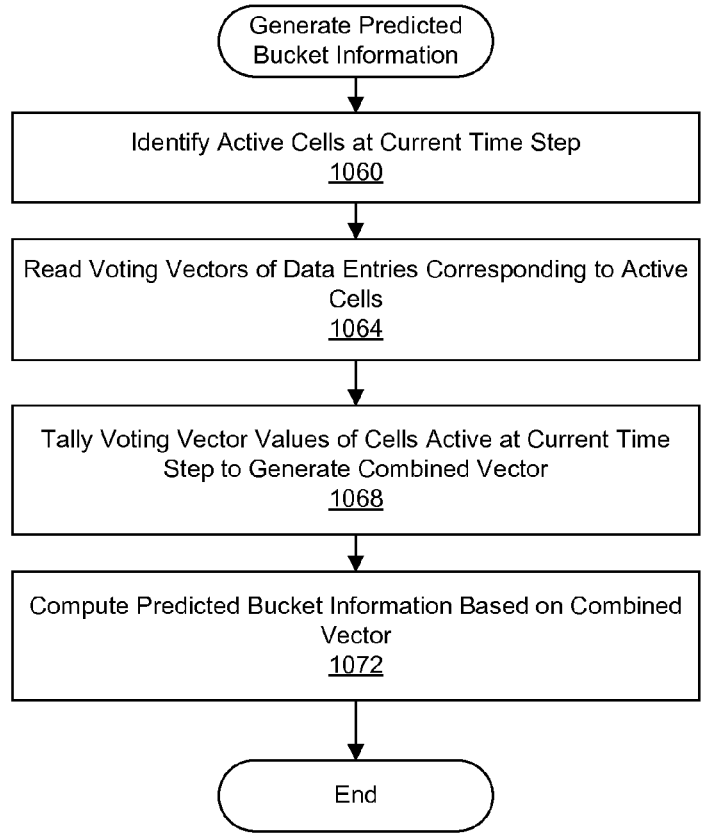
FIG. 10C is a flowchart illustrating the process of generating predicted bucket information, according to one embodiment.

FIG. 10C is a flowchart illustrating the process of generating predicted bucket information using data structure 1010, according to one embodiment. Cells that are activated non-predictively at a current time are identified 1060 from active output 324A. The voting vectors corresponding to the cells that are currently activated are then read 1064 from data structure 1010.

Voting vector elements of data entries corresponding to all currently active cells 1068 are tallied to obtain a combined vector. In one embodiment, vote values of data entries corresponding to active cells are added for each element of the spatial pooler input. For example, if only cells C11 and C12 are currently active, voting vectors of data entries corresponding to these two cells are added element-by-element to obtain a combined vector representing the tallied votes. Each element of the combined vector indicates likelihood that a corresponding element of the spatial pooler input is likely to be active multiple time steps later.

The predicted bucket information is computed 1072 based on the combined vector. In one embodiment, the predicted bucket information is set as the combined vector. In another embodiment, the combined vector is normalized to obtain the predicted bucket information.

The storing and identifying of mapping using data structure 1010 are merely illustrative. Various other ways may be used to store and identify the mapping of the active outputs to the spatial pooler inputs. For example, the storing and identifying of mapping may be accomplished by using a table with one column storing active outputs and another column storing spatial pooler inputs mapped to the active outputs.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A computer-implemented method comprising:
receiving input data including a temporal sequence of spatial patterns at a predictive system, the input data in a distributed representation form;
spatially pooling the input data to generate sparse vectors in a sparse distributed representation form by a spatial pooler of the predictive system;
temporally processing transitions of the sparse vectors to establish relationships between temporal sequences of spatial patterns in the input data by a sequence processor of the predictive system;
detecting a state of the predictive system at a first time responsive to receiving the input data; and
generating a prediction for a second time following the first time after a plurality of time steps based on the detected state of the predictive system and stored relationships, the stored relationships mapping states of the predictive system at third times to spatial patterns derived from the input data at fourth times, each of the third times preceding a corresponding one of the fourth times by the plurality of time steps, the fourth times preceding the first time, wherein the states of the predictive system comprise states of the sequence processor.

2. The method of claim 1, wherein the prediction is distribution of likelihood of values or range of values in the input data at the second time.

3. The method of claim 2, further comprising recommending an action based on the values or the range of values and the distribution of likelihood.

4. The method of claim 1, wherein the input data is fed to the spatial pooler of the predictive system for pooling spatial patterns in the input data.

5. The method of claim 1, wherein temporally processing the transitions comprises storing relationships of activation states of columns of cells connected with other cells in other columns to receive activation states of the other cells.

6. The method of claim 5, wherein the relationships are stored as values in entries of a data structure, each of the entries associated with a cell in the sequence processor, wherein each of the stored values in the entries represents frequency or a number of occurrences in which an associated element in the spatial patterns was active the plurality of time steps after the associated cell was activated.

7. The method of claim 6, wherein generating the prediction comprises tallying stored values in the entries corresponding to cells activated at the first time.

8. The method of claim 1, further comprising decoding the prediction to determine the input data at the second time.

9. The method of claim 1, updating the stored relationships responsive to receiving the input data.

10. A predictive system comprising:
a spatial pooler configured to receive spatial patterns derived from input data in a distributed representation form and generate sparse vectors based on the received spatial patterns;
a sequence processor configured to temporally process transitions of the sparse vectors to establish relationships between temporal sequences of spatial patterns in the input data;
a multistep predictor configured to:
detect a state of the predictive system responsive to receiving a spatial pattern at a first time; and
generate a prediction for a second time following the first time after a plurality of time steps based on the detected state of the predictive system and stored relationships, the stored relationships mapping states of the sequence processor at third times to spatial patterns derived from the input data at fourth times, each of the third times preceding a corresponding one of the fourth times by the plurality of time steps, the fourth times preceding the first time.

11. The predictive system of claim 10, further comprising an encoder configured to generate the input data in the distributed representation form using an encoding scheme.

12. The predictive system of claim 10, wherein the prediction is distribution of likelihood of values or range of values in the input data at the second time.

13. The predictive system of claim 12, further comprising an action or value matrix configured to recommend an action based on the values or the range of values and the distribution of likelihood.

14. The predictive system of claim 10, wherein the sequence processor comprises a plurality of cells arranged in a plurality of columns, cells in a column having connections with other cells in other columns to predictively activate the cells in the column based on activation of the other cells in the other columns.

15. The predictive system of claim 14, wherein the multistep predictor is configured to store the relationships as values in entries of a data structure, each of the entries associated with a cell in the sequence processor, wherein each of the stored values in the entries represents frequency or a number of occurrences in which an associated element in the spatial patterns was active the plurality of time steps after the associated cell was activated.

16. The predictive system of claim 15, wherein the multistep predictor is configured to generate the prediction by tallying stored values in the entries corresponding to cells activated at the first time.

17. A non-transitory computer readable storage medium configured to store instructions, when executed by a processor cause the processor to:
receive input data including a temporal sequence of spatial patterns at a predictive system, the input data in a distributed representation form;
spatially pool the input data to generate sparse vectors in a sparse distributed representation form by a spatial pooler of the predictive system;
temporally process transitions of the sparse vectors to establish relationships between temporal sequences of spatial patterns in the input data by a sequence processor of the predictive system;
detect a state of the predictive system at a first time responsive to receiving the input data; and
generate a prediction for a second time following the first time after a plurality of time steps based on the detected state of the predictive system and stored relationships, the stored relationships mapping states of the predictive system at third times to spatial patterns derived from the input data at fourth times, each of the third times preceding a corresponding one of the fourth times by the plurality of time steps, the fourth times preceding the first time, wherein the states of the predictive system comprise states of the sequence processor.

* * * * *